(12) United States Patent
Dal Canale

(10) Patent No.: US 12,678,904 B2
(45) Date of Patent: Jul. 14, 2026

(54) MACHINE FOR PROCESSING OF LENSES, PREFERABLY IN PLASTIC MATERIAL

(71) Applicant: COSTRUZIONI MECCANICHE E TECNOLOGICHE S.R.L., Santa Maria di Sala (IT)

(72) Inventor: Lorenzo Dal Canale, Santa Maria di Sala (IT)

(73) Assignee: COSTRUZIONI MECCANICHE E TECHNOLOGICHE S.R.L., Santa Maria di Sala (IT)

( * ) Notice: Subject to any disclaimer, the term of this patent is extended or adjusted under 35 U.S.C. 154(b) by 382 days.

(21) Appl. No.: 18/421,800

(22) Filed: Jan. 24, 2024

(65) Prior Publication Data

US 2024/0246185 A1      Jul. 25, 2024

(30) Foreign Application Priority Data

Jan. 25, 2023    (IT) ........................ 102023000001107

(51) Int. Cl.
 *B23Q 7/04*      (2006.01)
 *B23C 3/16*      (2006.01)
    (Continued)

(52) U.S. Cl.
 CPC ................ *B23Q 7/046* (2013.01); *B23C 3/16* (2013.01); *B23K 26/362* (2013.01);
    (Continued)

(58) Field of Classification Search
 CPC ....... Y10T 29/5136; Y10T 409/305264; Y10T 409/30532; Y10T 409/308344;
    (Continued)

(56) References Cited

U.S. PATENT DOCUMENTS

| | | | | |
|---|---|---|---|---|
| 4,662,119 A | * | 5/1987 | Kojima | ............... B24B 13/0037 |
| | | | | 451/159 |
| 5,174,071 A | * | 12/1992 | Tommasini | ............ B23Q 39/04 |
| | | | | 82/124 |
| 6,189,680 B1 | * | 2/2001 | Nakamura | ............ B24B 37/345 |
| | | | | 198/750.12 |
| 7,422,510 B2 | * | 9/2008 | Schneider | ........... B24B 27/0061 |
| | | | | 451/384 |

(Continued)

FOREIGN PATENT DOCUMENTS

| | | | | |
|---|---|---|---|---|
| DE | 3631718 A1 | * | 3/1988 | ............. B23Q 7/048 |
| EP | 1719582 A1 | * | 11/2006 | ......... B24B 27/0076 |

(Continued)

OTHER PUBLICATIONS

Italian Search Report received for Italian Serial No. 202300001107 on Jul. 20, 2023, 2 pgs.

*Primary Examiner* — Sunil K Singh
*Assistant Examiner* — Michael Vitale
(74) *Attorney, Agent, or Firm* — Merchant & Gould P.C.

(57) ABSTRACT

A machine for processing lenses includes an apparatus for loading and storing raw lenses having a lens exit portion, a lens cutting system including a first lens housing seat and a first spindle-holder head for a cutting tool positionable at the first seat by a first articulated arm, a lens drilling-milling-engraving system including a second lens housing seat and a second spindle-holder head for a drilling-milling-engraving tool, a processed lens unloading zone, a lens transfer apparatus, and a management and control unit. The lens exit portion, the first and second lens housing seats, and the processed lens unloading zone constitute four operating stations. The lens transfer apparatus includes a turret having four suction-cup seats to receive a single lens. A first motor rotates the turret to cyclically bring each transport seat in sequence to the four operating stations.

26 Claims, 25 Drawing Sheets

(51) Int. Cl.
    *B23K 26/362*         (2014.01)
    *B29D 11/00*         (2006.01)

(52) U.S. Cl.
    CPC .. *B29D 11/00423* (2013.01); *B29D 11/00961*
        (2013.01); *Y10T 29/5136* (2015.01); *Y10T*
        *483/16* (2015.01)

(58) Field of Classification Search
    CPC ......... Y10T 409/308568; Y10T 483/16; Y10T
        483/165; B23C 2215/40; B23Q 3/16;
        B23Q 7/041; B23Q 7/043; B23Q 7/046;
        B23Q 7/048; B23Q 39/046; B24B
        13/0037; B29D 11/00423; B29D
        11/00932; B29D 11/00961
    USPC ........... 483/14, 15; 409/158, 159, 203, 217;
        29/564
    See application file for complete search history.

(56) References Cited

U.S. PATENT DOCUMENTS

| | | | |
|---|---|---|---|
| 8,166,622 B2 * | 5/2012 | Meyer | B24B 13/06 |
| | | | 29/56 |
| 9,289,877 B2 * | 3/2016 | Schafer | B24B 41/053 |
| 10,022,800 B2 * | 7/2018 | Mandler | B23B 3/32 |
| 2006/0260448 A1 | 11/2006 | Fiedler | |
| 2020/0215657 A1 * | 7/2020 | Schneider | B29D 11/00942 |
| 2021/0170540 A1 * | 6/2021 | Schneider | B24B 27/0023 |
| 2023/0150078 A1 * | 5/2023 | Buchenauer | B23Q 5/22 |
| | | | 483/15 |
| 2023/0347468 A1 * | 11/2023 | Schäfer | B24B 13/0031 |
| 2024/0042563 A1 * | 2/2024 | Schäfer | B24B 13/0057 |

FOREIGN PATENT DOCUMENTS

| | | | | |
|---|---|---|---|---|
| EP | 3747641 A2 | 12/2020 | | |
| JP | 58034740 A | * 3/1983 | ............ | B23Q 7/048 |

* cited by examiner

MACHINE FOR PROCESSING OF LENSES, PREFERABLY IN PLASTIC MATERIAL

CROSS-REFERENCE TO RELATED APPLICATION

This application claims the benefit of priority to Application 102023000001107, filed Jan. 25, 2023 in Italy, and which application is incorporated herein by reference. To the extend appropriate, a claim of priority is made to the above-disclosed application.

FIELD OF APPLICATION

The object of the present invention is a machine for processing lenses, preferably in plastic material.

The machine according to the invention makes it possible to perform a greater number of machining operations than comparable machines by reducing processing times.

In particular, the machine according to the invention is capable of performing all of the following operations on lenses:

cutting
drilling
milling
engraving.

The machine according to the invention may be configured to perform all of the following further operations on lenses:

inserting characters and drawings using lasers or printing systems
automatically loading the lenses to be processed
automatically unloading the processed lenses
evacuating machining swarf and shavings.

PRIOR ART

The processing of lenses, in particular in plastic material, is currently performed in multiple steps, each by means of a machine that is dedicated to the task. This significantly slows down the processing of lenses due to the long periods of downtime between one process and another.

The main lens processing steps are:

the cutting of the lens and
the drilling, the engraving and the milling of the lens.

Generally, the drilling, engraving and milling operations for lenses are added to the cutting operations. Therefore, if such operations are performed, the production cycle is slowed down.

There is therefore the need to integrate into one machine all of the cutting operations and, when running, the operations for the drilling, engraving and milling of the lenses, thereby increasing the operational flexibility of current machines.

Known are machines for the cutting of lenses in plastic material. Generally, such machines are suitable to perform the lens cutting operation and the subsequent steps of milling and engraving.

In more detail, the cutting tool works in three axis. A first axis defines a linear movement, the second and third axes are defined by two rotating lens support axes that operationally place the lens itself in movement around the second and third axis. Due to the limited number of axes the operational flexibility of such machines is, however, reduced. In order to perform some types of cut, in compensating for the limited number of degrees of freedom of the tool, such machines need in fact to use shaped tools. The cut is however influenced by the shape of the cutting tool. It follows that not all of the required work may be performed in a workmanlike manner.

There also exists therefore the need to arrange a machine for processing lenses that is both capable of cutting in a direction that is normal to the surface of the lens (in also being able to use non-shaped tools) and at the same time capable of creating cutting angles that a shaped tool cannot achieve.

Generally, the tool that is used for the drilling, engraving and milling also works on three axes. Two rotating axes and one linear for moving the tool. Such machines are not however capable of performing drilling, engraving and milling using angles other than the direction that is normal to the surface of the lens.

There also exists therefore the need for a machine that makes it possible to perform drilling, engravings and milling using angles other than the direction that is normal to the surface of the lens.

As is known, it is possible to have requests for the creation of characters and/or drawings on the lenses by means of laser or printing systems.

For the same reasons that prompted the separation of the cutting from the drilling, engraving and milling operations, the operations for creating characters and drawings on the lenses are also performed in machines that a separate from those that perform the cutting of lenses. Also in this case however there is as a consequence a production line complication.

There is therefore the further need to integrate into one machine not only the cutting operations and the operations of drilling, engraving and milling, but also the operations for creating characters and drawings.

The operations for the loading of raw lenses and the unloading of processed lenses are also affected by those operations that are performed on the lenses themselves (cutting, drilling, engraving and milling).

There exists therefore the need for a machine for processing lenses that makes it possible to perform the operation of loading and unloading lenses independently of those operations that are performed on the lenses themselves within the machine.

Finally, there is also the need to arrange for a machine for processing lenses that is easy to clean and maintain.

To date all of the aforementioned needs remain unsatisfied.

DISCLOSURE OF THE INVENTION

The main object of the present invention is therefore that of eliminating or at least mitigating the drawbacks of the aforementioned known technique in providing a machine for processing lenses, preferably in plastic material, that integrates the cutting operations and, when running, the operations for the drilling, engraving and milling of the lenses, thereby increasing the operational flexibility of current machines.

A further object of the present invention is to provide a machine for processing lenses that is both capable of cutting in a direction that is normal to the surface of the lens (in also being able to use non-shaped tools) and at the same time capable of creating cutting angles that a shaped tool cannot create.

A further object of the present invention is to provide a machine for processing lenses that makes it possible to perform the operations for the drilling, engraving and milling of lenses using angles other than the direction that is normal to the surface of the lens, thereby increasing the operational flexibility thereof, without, however affecting productivity.

A further object of the present invention is to provide a machine for processing lenses that integrates operations for creating characters and drawings on the lenses, increasing the operational flexibility thereof, without, however affecting productivity.

A further object of the present invention is to provide a machine for processing lenses that makes it possible perform the operations of loading and unloading lenses independently of the processing operations that are performed on the lenses.

A further object of the present invention is to provide a machine for processing lenses that is mechanically reliable.

A further object of the present invention is to provide a machine for processing lenses that is at the same time simple to construct.

A further object of the present invention is to provide a machine for processing lenses that is simple to clean and maintain.

BRIEF DESCRIPTION OF THE DRAWINGS

The technical features of the invention, according to the aforementioned objectives, may be clearly seen in the content of the claims below, and the advantages thereof will become more readily apparent in the detailed description that follows, made with reference to the accompanying drawings, which represent one or more purely exemplifying and non-limiting embodiments thereof, wherein:

Figure 1:
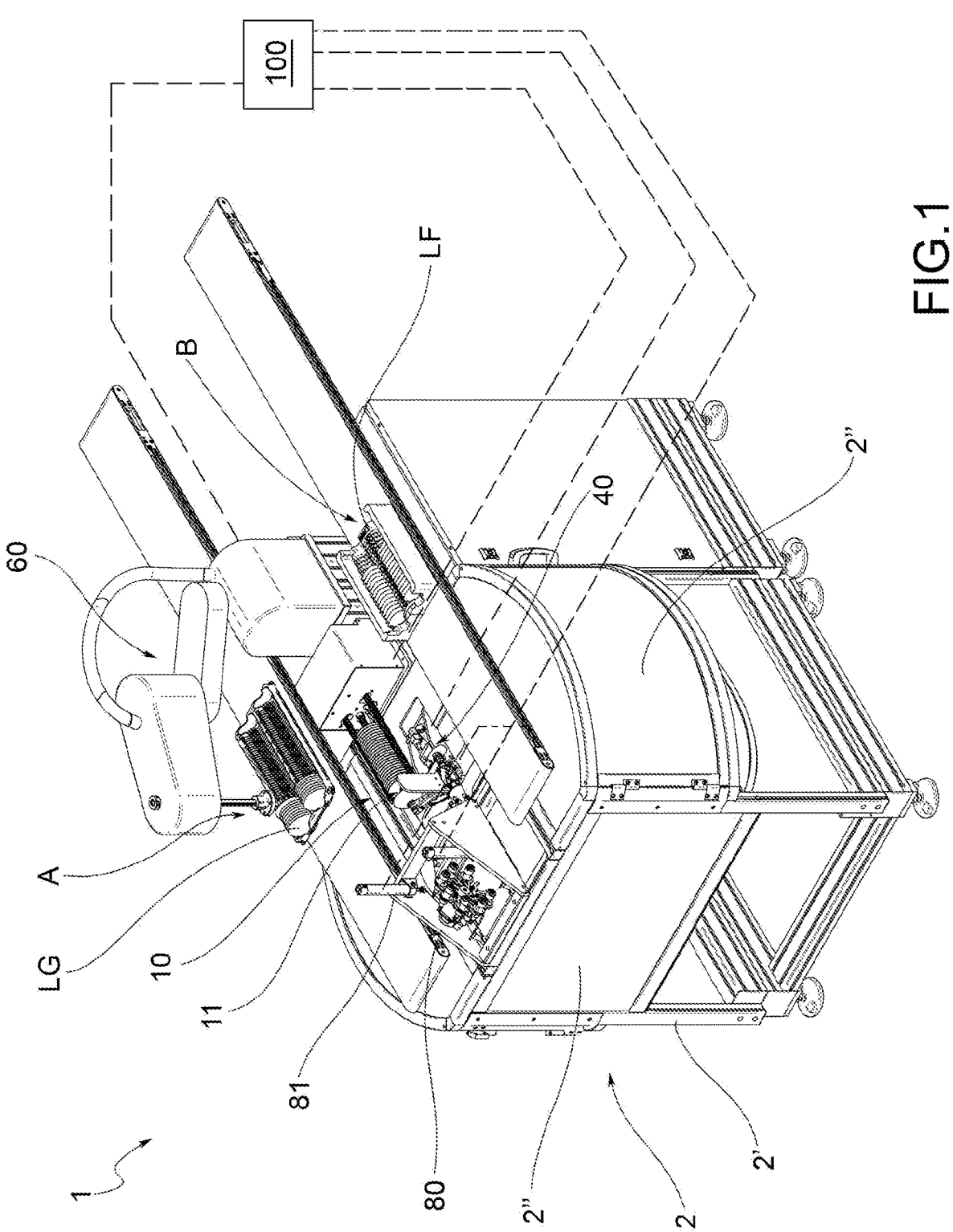
FIGS. 1 and 2 show two front perspective views of a machine for processing lenses according to a preferred embodiment of the invention.

Elements or parts of elements common to the embodiments described above will be indicated with the same numerical references.

DETAILED DESCRIPTION

The object of the present invention is a machine for processing lenses, preferably in plastic material.

The machine for processing lenses according to the invention has been indicated as a whole by the reference numeral 1 in the accompanying figures.

Here and in the following description and claims, reference will be made to the machine for processing lenses in the condition of use. Therefore, any references to a lower or upper position or to a horizontal or vertical orientation should be interpreted in this sense.

According to a general embodiment of the invention, the machine 1 for processing lenses comprises a support structure 2, that in particular (as shown in the accompanying figures) may comprise a load-bearing frame 2' whereto, advantageously, panels 2" may be attached in order to delimit enclosed or partially enclosed housing seats and/or to define support floors.

The machine 1 comprises an apparatus 10 for loading and storing raw lenses that in turn comprises a lens exit portion 11 and is installed on said support structure 2.

Preferably the apparatus 10 for loading and storing raw lenses is suitable to move said raw lenses towards said lens exit portion 11.

According to a preferred embodiment of the invention, the apparatus 10 for loading and storing raw lenses is suitable to move said raw lenses towards said lens exit portion 11. Preferably, the apparatus 10 for loading and storing raw lenses is controlled by a management and control unit 100, as shown in FIG. 1.

Preferably, the apparatus 10 for loading and storing raw lenses is made according to the description in Italian patent application No. 102022000012539 filed on behalf of the same applicant and incorporated herein in the entirety thereof by reference.

The machine 1 comprises, furthermore:

a lenses cutting system 20;

a lens drilling-milling-engraving system 30;

a processed lenses unloading zone 40;

a lens transfer apparatus 50;

a management and control unit 100.

The term "lens cutting" refers to the operation that has the aim of obtaining a lens having a predefined perimeter contour by removing from a raw lens LG by means of cutting, the material that is external to said contour. The cut may follow a closed line or be defined by separate cutting lines.

The term "lens drilling" refers to the operation that has the aim of making one or more holes in a lens that are intended, for example, to be used to fix the lens to the spectacle frame or for the insertion of decorative elements.

The term "lens milling" refers to the operation that has the aim of obtaining upon a shaped lens—according to the shape of the spectacle frame—reliefs or seats for decorative elements, rhinestones or otherwise.

The term "lens engraving" refers to the operation that has the aim of making one or more engravings on the surface of a lens that are intended, for example, to be used to fix the lens to the spectacle frame or for defining decorative elements.

As shown in particular in the Figures from 7 to 9, the lens cutting system 20 is installed onto said support structure 2 and comprises in turn:

a first lens housing seat 200 that is suitable to receive one lens at a time;

a first spindle-holder head 210 for a cutting tool positionable at said first seat 200 by means of a first articulated arm 211 connected to said support structure 2 to perform cutting operations on said lens.

As shown in particular in the Figures from 10 to 15, the lens drilling-milling-engraving system 30 is also installed on said support structure 2 and in turn comprises:

a second lens housing seat 300 that is suitable to receive one lens at a time; and a second spindle-holder head 310 for at least one drilling or milling or engraving tool positionable at said second seat 300 by means of a second articulated arm 311 connected to said support structure 2 to perform drilling-milling-engraving operations on said lens.

Advantageously, the drilling, milling and engraving operations are performed separately from each other by means of specific tools; furthermore, the execution of all three operations is optional, it also being possible to envisage the execution of only one thereof.

Advantageously, the use of articulated arms for the movement of the two spindle-holder heads 210 and 310 avoids the adoption of movement and linear sliding systems, which are subject to the problem of the depositing of falling machining swarf/shavings. This translates into increased ease of cleaning and maintenance.

Figure 6:
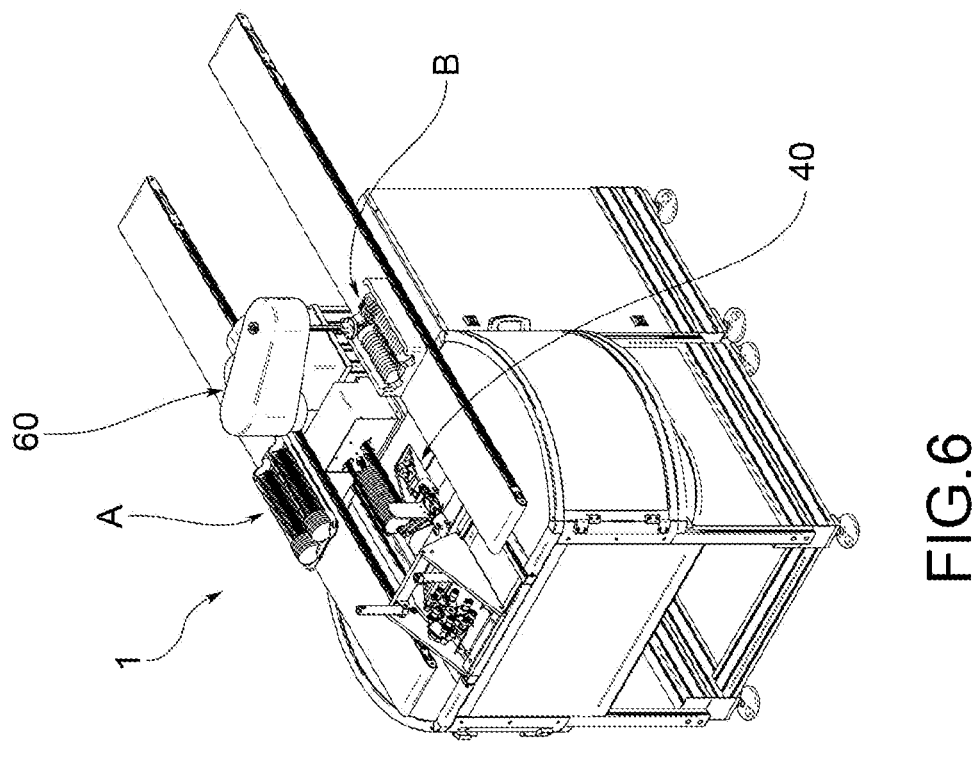
FIGS. 5 and 6 show two perspective views of the machine of FIG. 1 in the configuration assumed during a step of transferring processed lenses from an unloading zone that is internal to the machine to an external storage.
Figure 5:
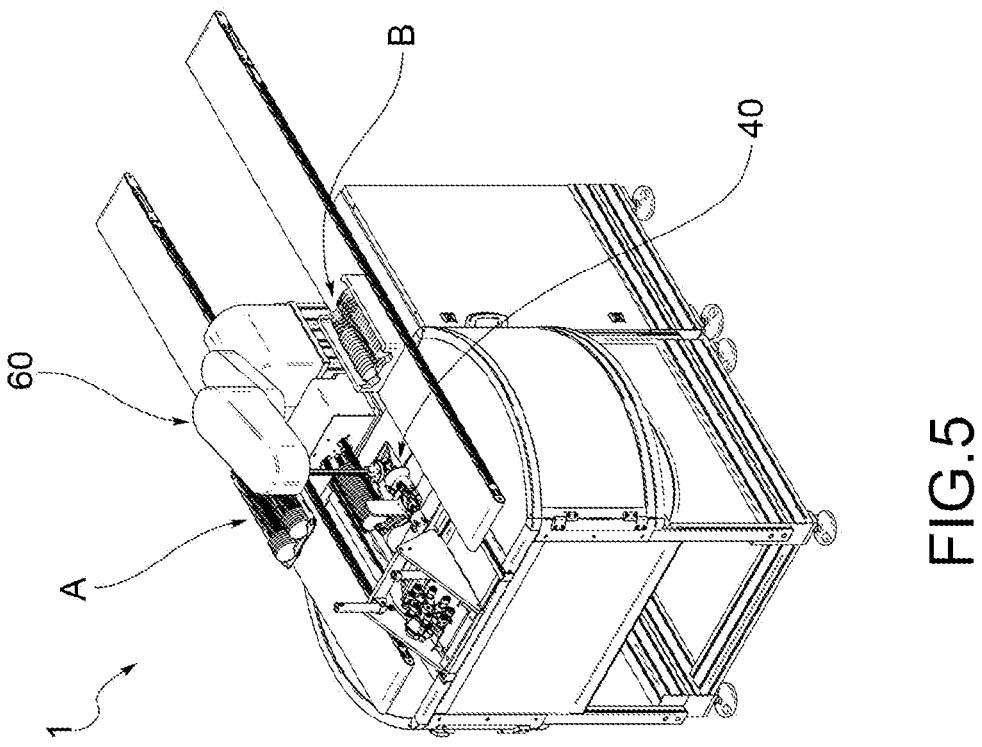

As shown in particular in FIGS. 5 and 6, the processed lens unloading zone 40 is also obtained on said support structure 2.

Figure 25:
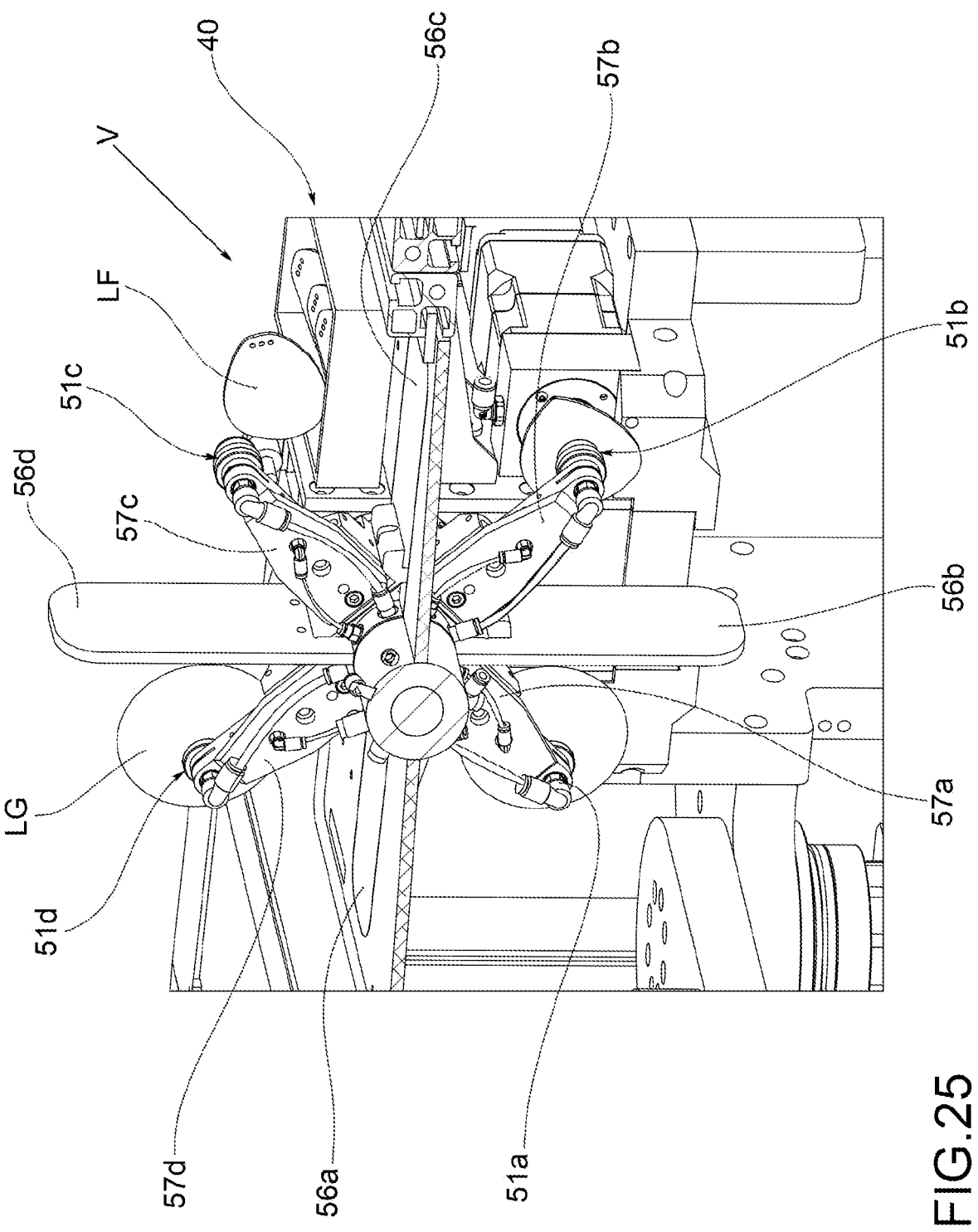
Figure 26:
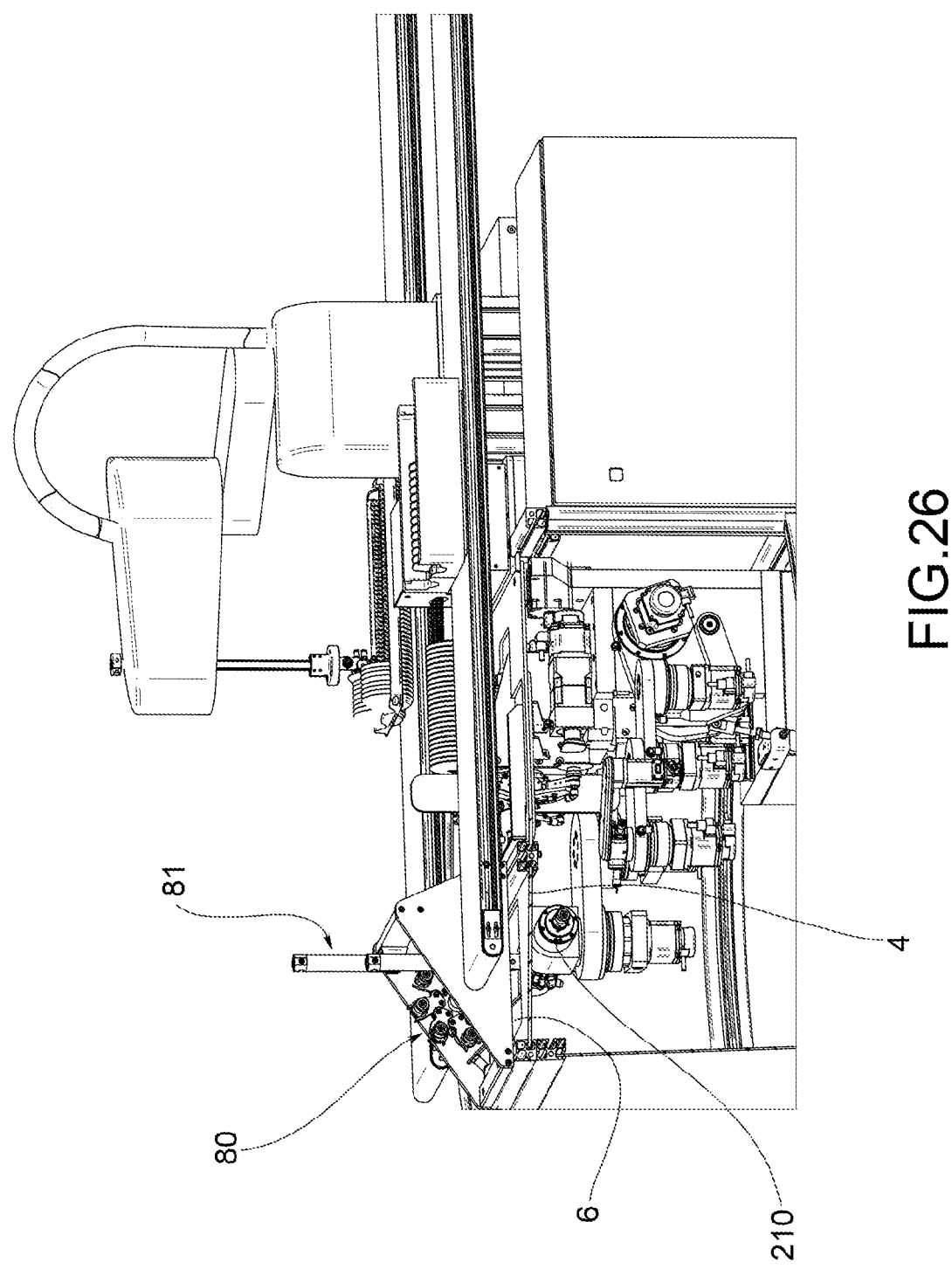
FIGS. 26, 27 and 28 show three perspective views of the machine of FIG. 10 wherein a cutting tool storage is shown in three different operational positions.
Figure 27:
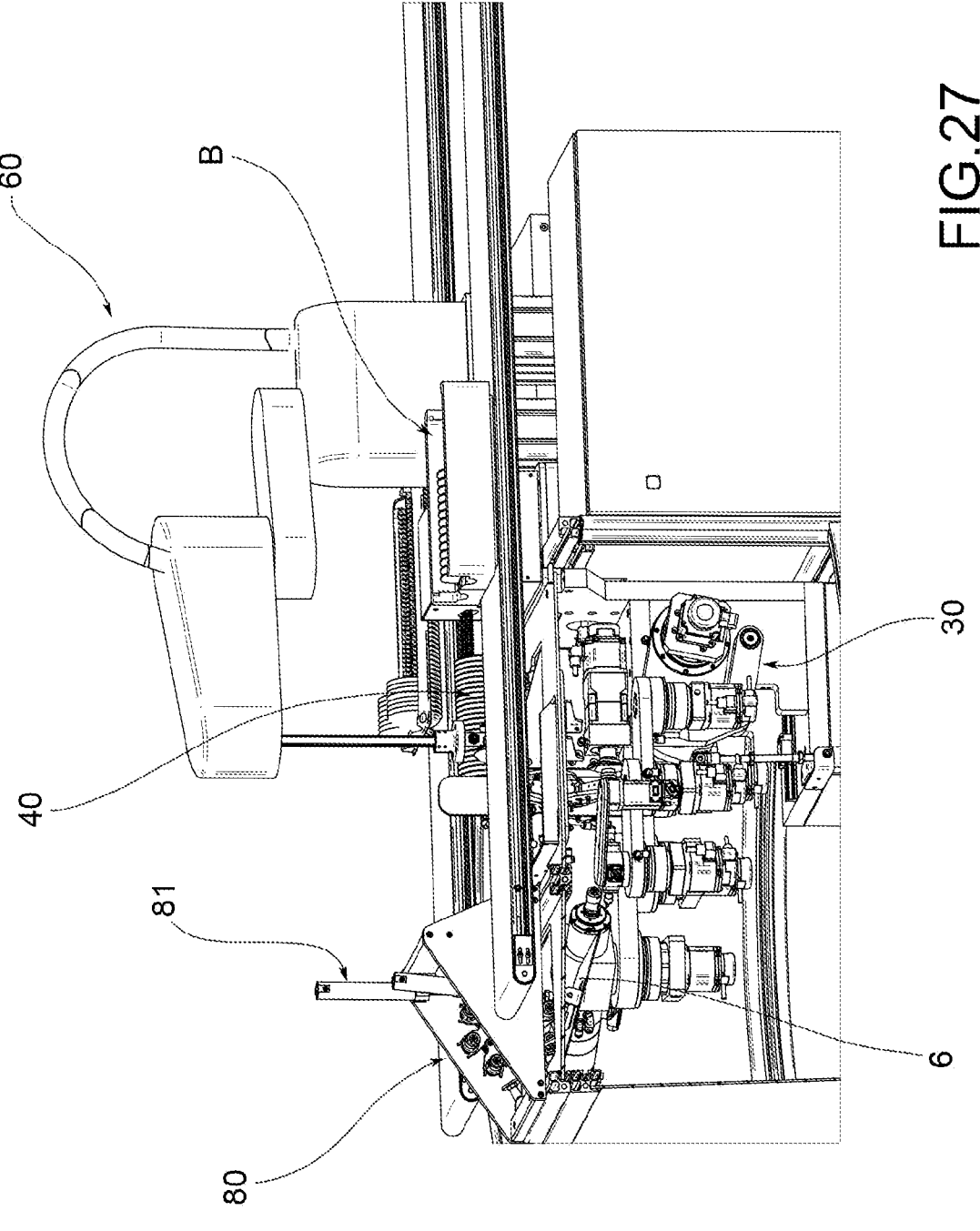
Figure 28:
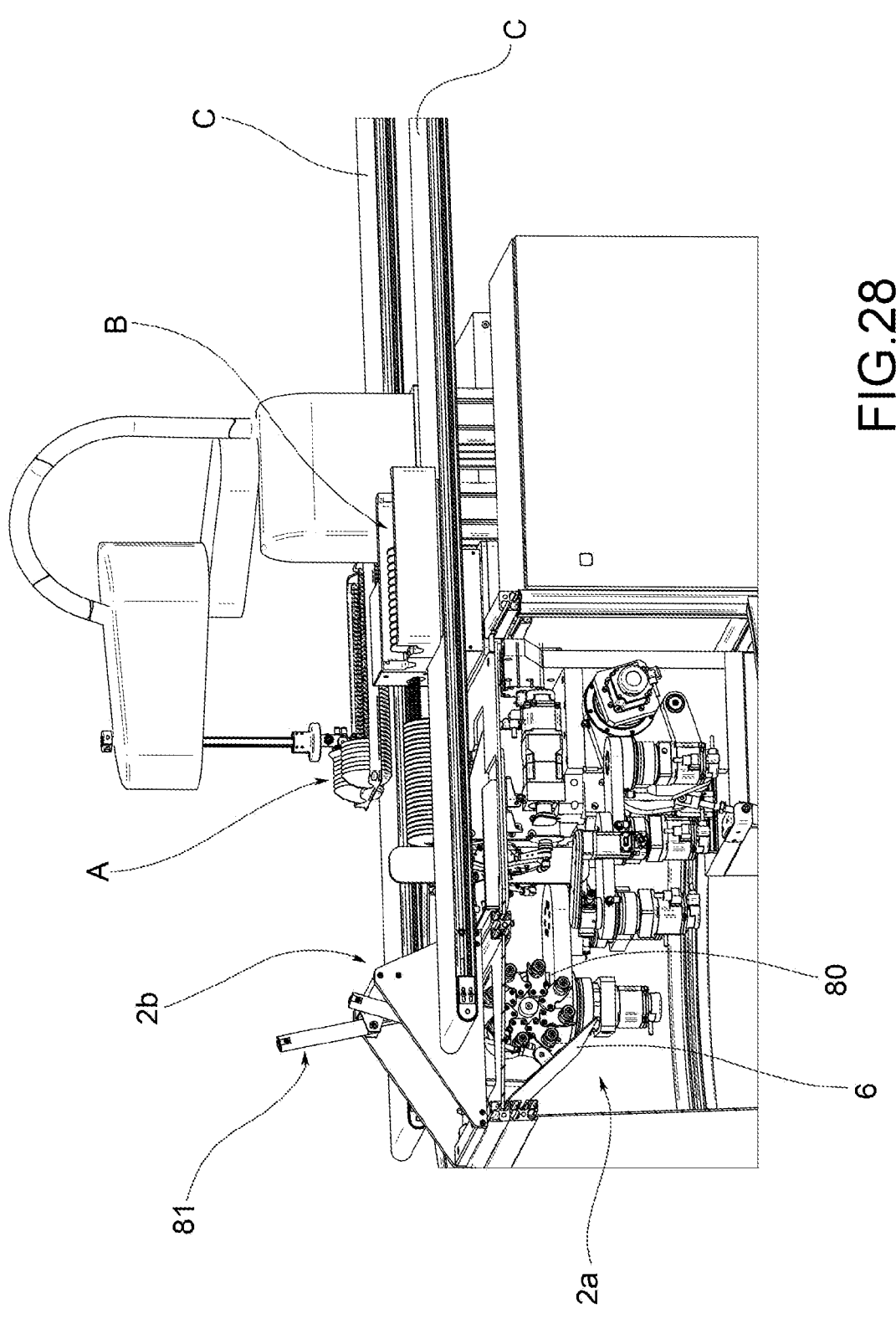

The lens unloading zone 40 may be a simple finished lens passage zone without stationing, as shown in FIGS. 5 and 6, or else it may be a zone for the storage of the finished lenses FL, wherein, for example, a collection vessel V may be arranged, as shown in FIG. 25.

The lens exit portion 11 of said apparatus 10 for loading and storing raw lenses, the first lens housing seat 200 of said lens cutting system 20, the second lens housing seat 300 of said lens drilling-milling-engraving system 30 and said processed lens unloading zone 40 constitute four operating stations of said machine 1, indicated hereinafter respectively as the first, second, third and fourth stations.

Advantageously, the aforementioned four stations are arranged in fixed positions. This is particularly advantageous for the lens loading operations which, insofar as they occur in a fixed position, are not influenced by any eventual lens format changes. A lens format change therefore occurs without loss of time due to the realignment of the position of the lenses. In other words the cycle setup is improved.

In more detail, the lens transfer apparatus 50 is suitable to pick up one lens at a time from said apparatus 10 for loading and storing at said lens exit portion 11 (first operating station) in order to bring it sequentially:

into the first lens housing seat 200 of said lens cutting system 20 (second operating station);

into the second lens housing seat 300 of said lens drilling-milling-engraving 30 system (third operating station); and into the processed lens unloading zone 40 (fourth operating station).

As shown in particular in FIGS. 17 and 23-25, the lens transfer apparatus 50 comprises a turret 51 having four lens suction-cup seats 51a,b,c,d for transporting lenses. Each of said transport seats 51a,b,c,d is suitable to receive one lens at a time.

The lens transfer apparatus 50 comprises first motor means 52 suitable to rotate the turret around a turret axis X so as to cyclically bring each transport seat 51a,b,c,d in sequence to the aforementioned four operating stations.

These four operating stations 11, 200, 300, 40 are arranged on a circumference centered on said turret axis X in angular positions spaced 90° apart from each other. Preferably, said first motor means 52 are controlled by said management and control unit 100, as shown in FIG. 1.

By virtue of the invention, the operations for picking-up a new raw lens, lens cutting, lens drilling/milling/engraving and finished lens releasing are performed contemporaneously (fully operational) on four different lenses. In particular, by virtue of such technical solution the lens drilling, milling and engraving operations occur during running time with respect to the cutting operations.

Again, by virtue of such technical solution, the downtimes for the transferring of a lens from one station to another are concentrated within a single time interval. This therefore avoids summing the various downtimes that are associated with a reduction in production time.

The machine 1 for processing lenses, preferably in plastic material, according to the invention therefore integrates the lens cutting, drilling and milling operations, thereby increasing operating flexibility with respect to machines of the known art, and at the same time makes it possible to significantly reduce the downtime of transferring a lens from one station to another, so that productivity is less affected.

Figure 7:
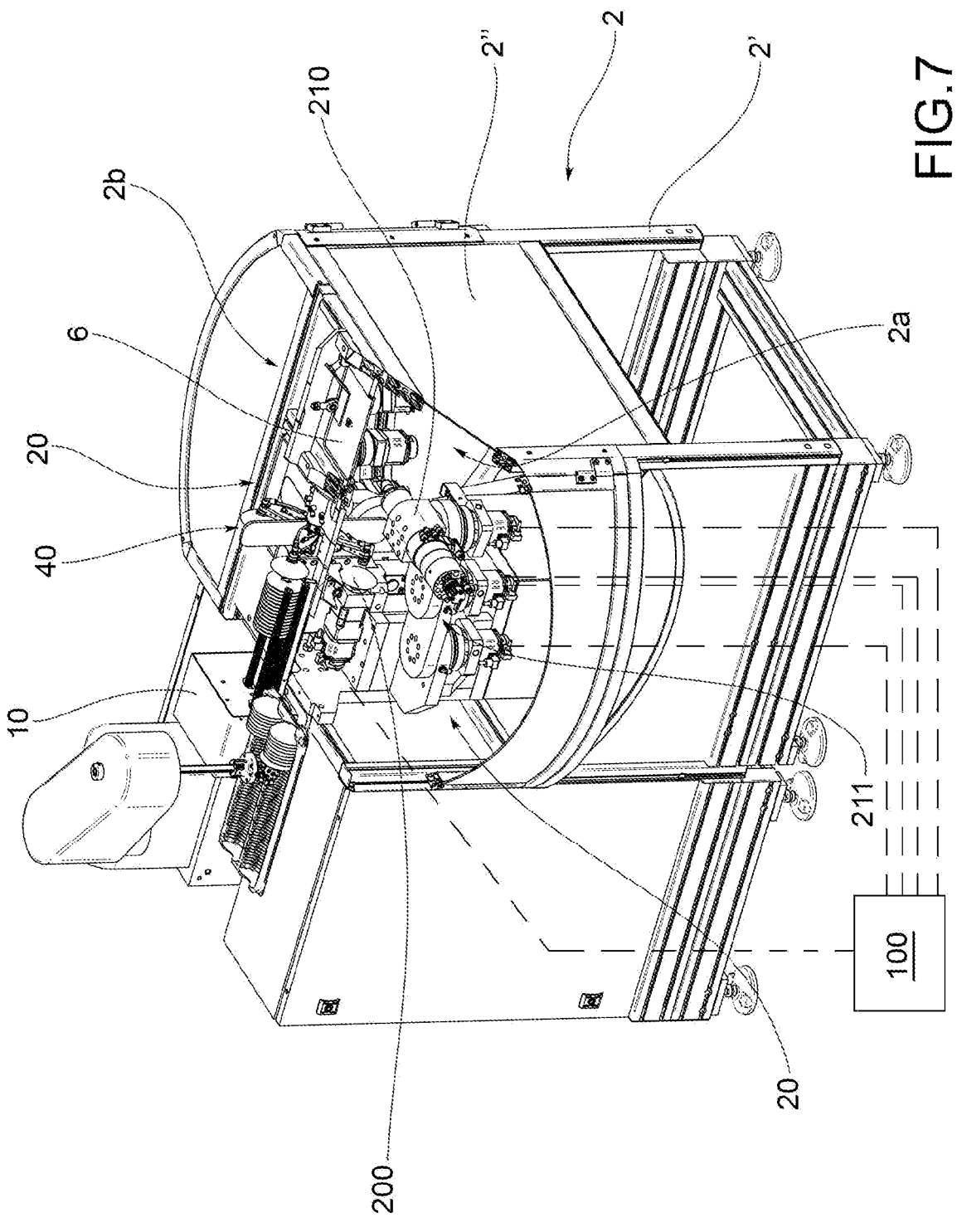
FIGS. 7, 8 and 9 show three perspective views of the machine of FIG. 2 with some parts removed to better highlight others and partially cross-sectioned at the area wherein a lens cutting system is arranged.
Figure 12:
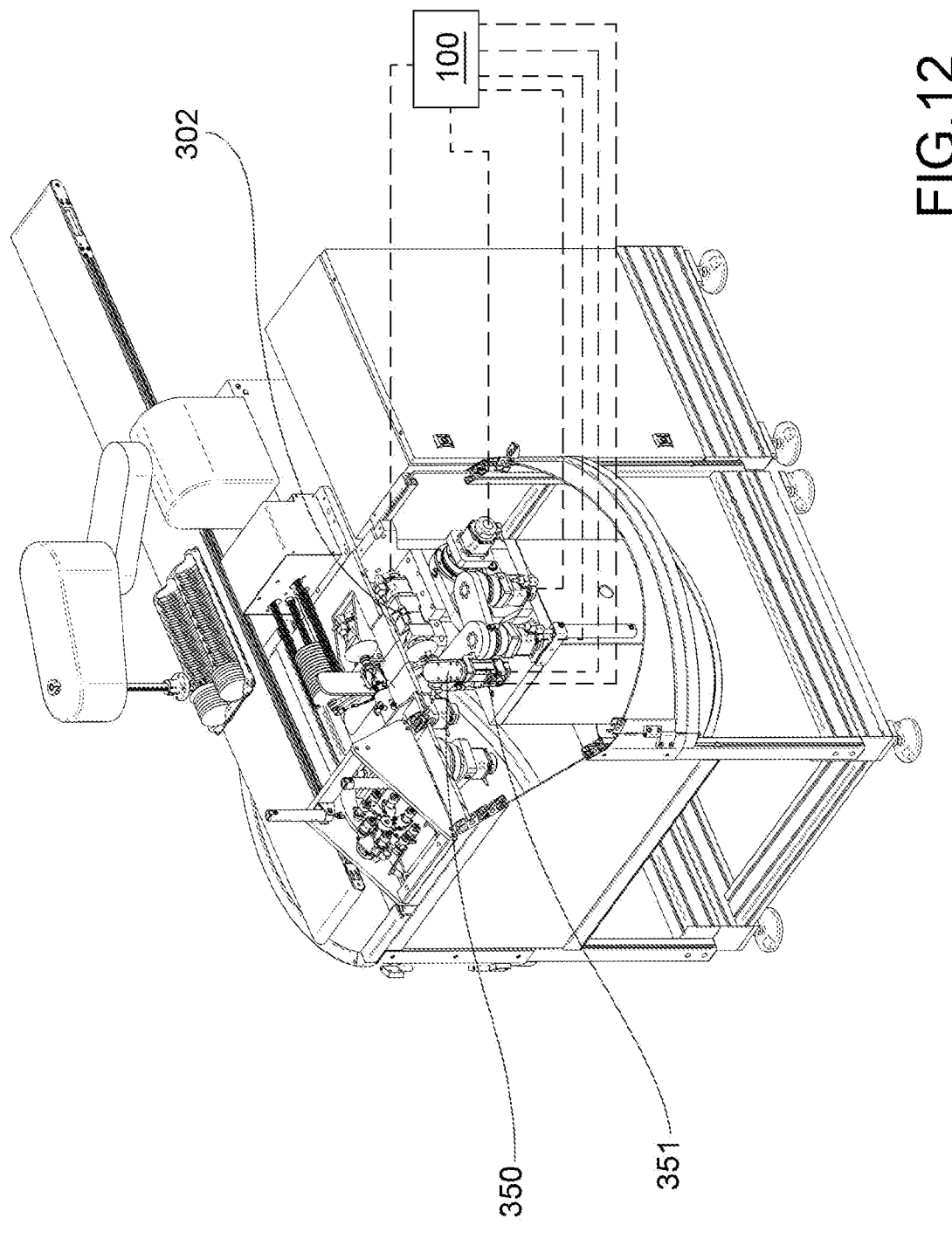
Figure 13:
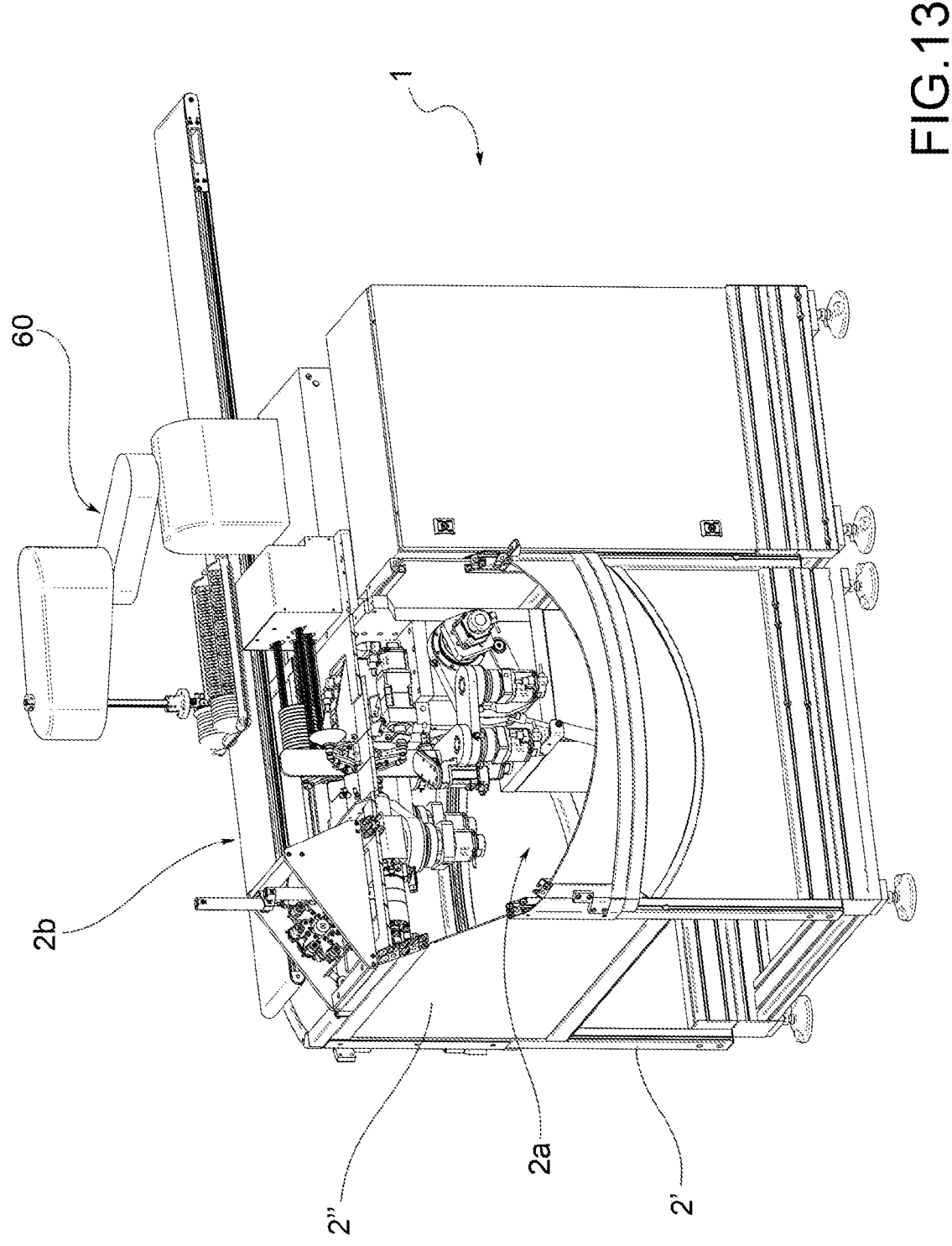
Figure 14:
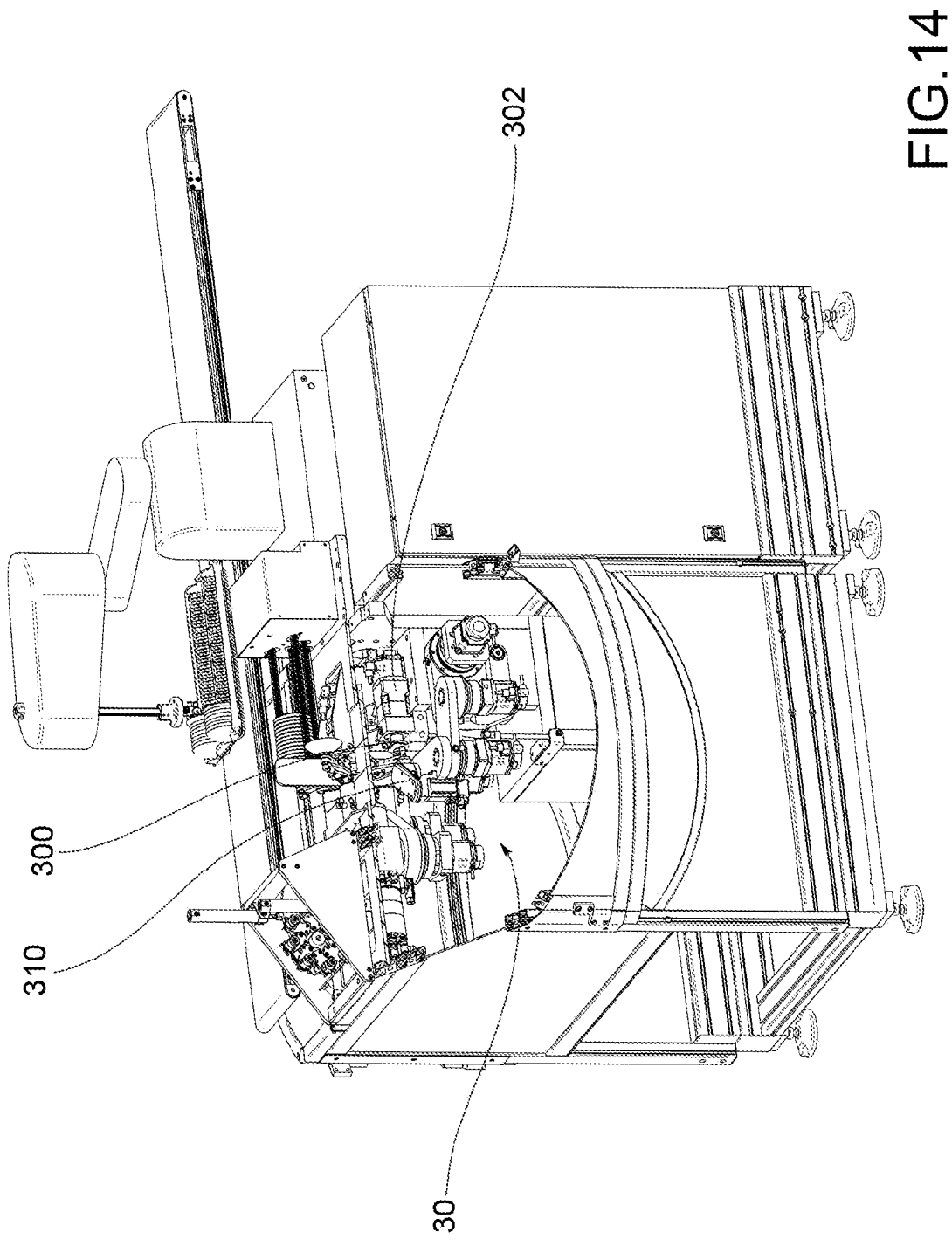
Figure 15:
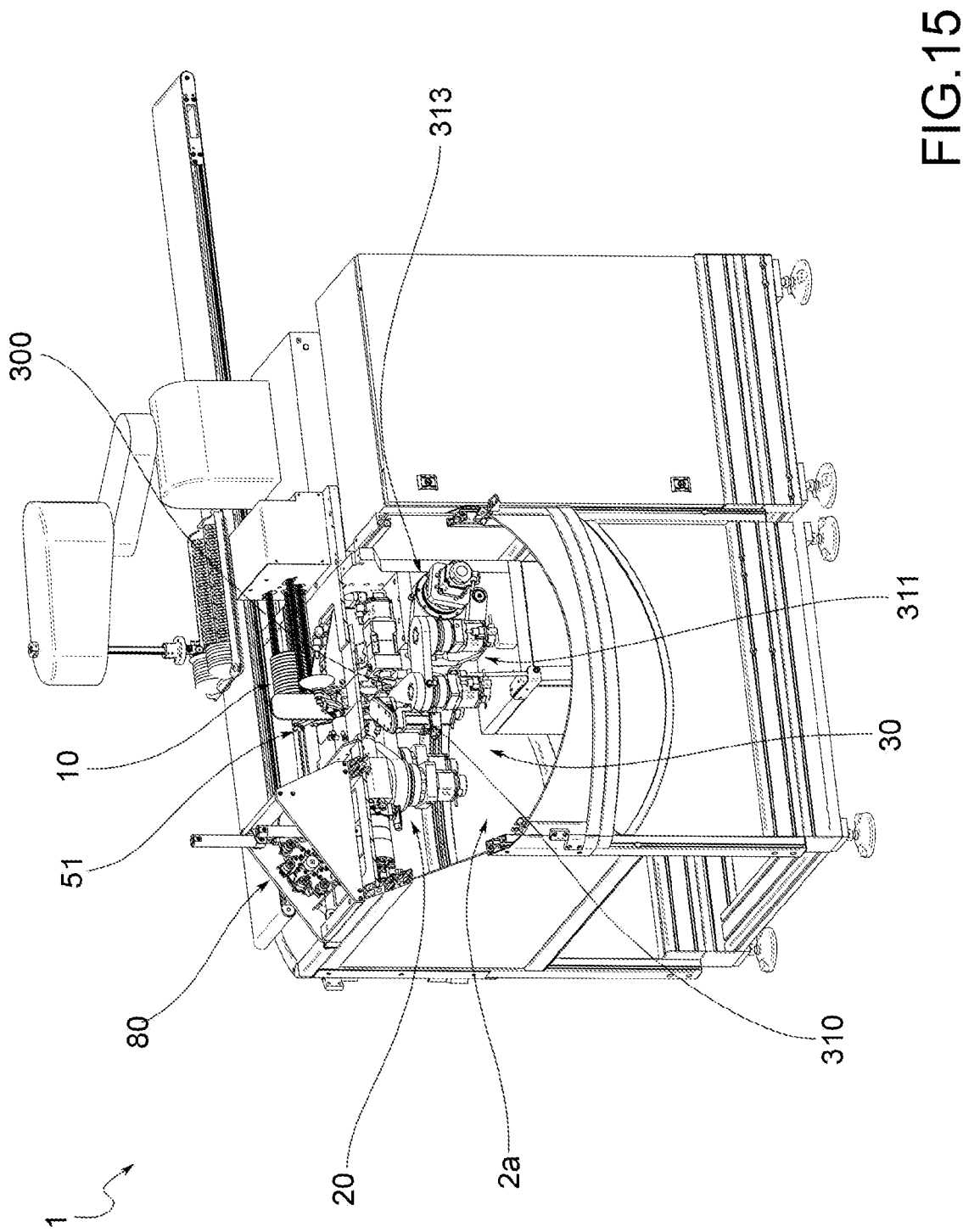
Figure 16:
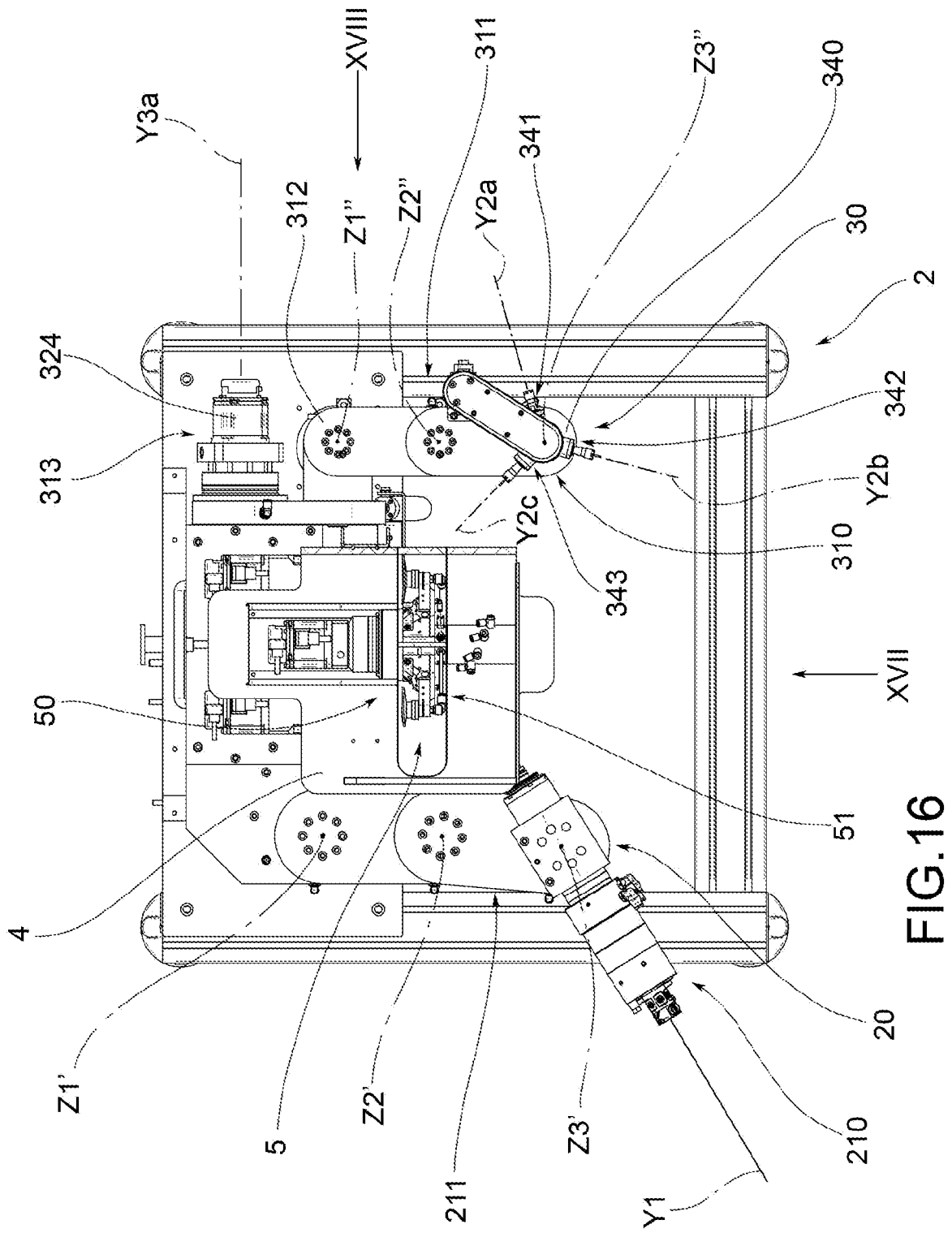
FIG. 16 shows an orthogonal view from above of the machine of FIG. 1 with some parts removed to better highlight others and partially cross-sectioned.
Figure 17:
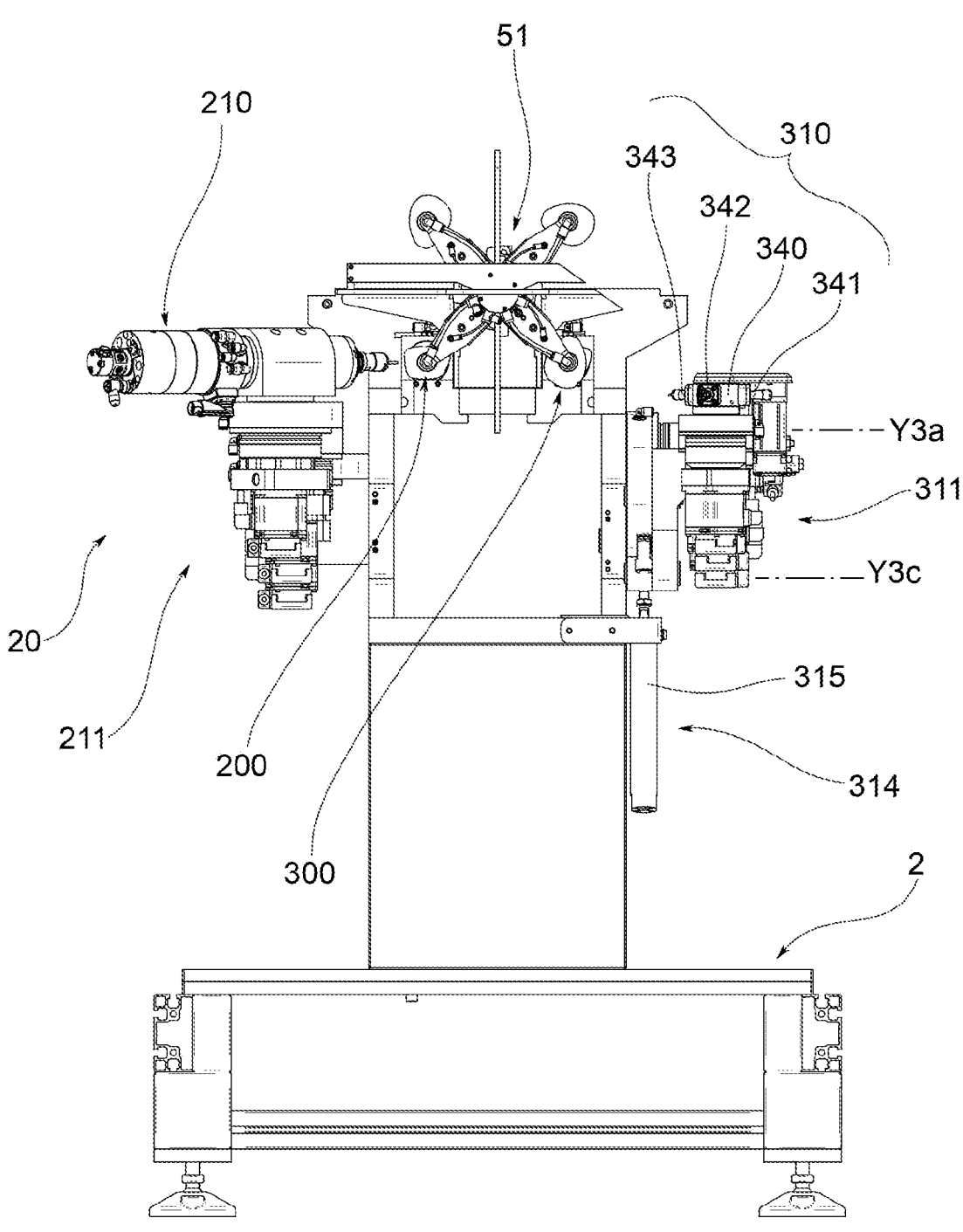
FIG. 17 shows an elevated orthogonal view of the machine shown in FIG. 16 according to the arrow XVII shown therein.
Figure 18:
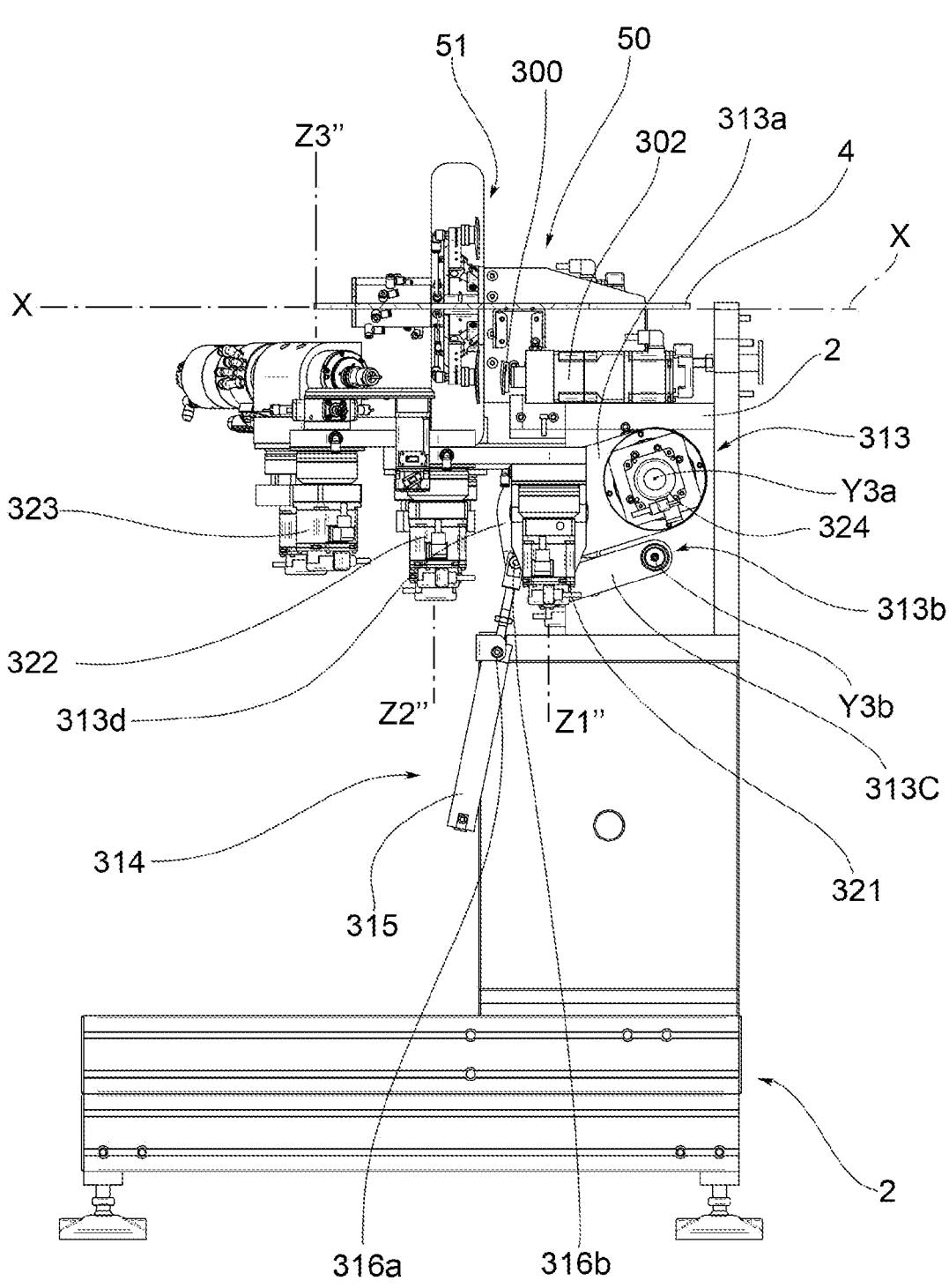
FIG. 18 shows an elevated orthogonal view of the machine shown in FIG. 16 according to the arrow XVIII shown therein.

Advantageously, as shown in FIGS. 7 and 12, the management and control unit 100 is programmed to control said lens transfer apparatus 50, said lens cutting system 20 and said lens drilling-milling-engraving 30 so that when fully operational the machine 1 cyclically repeats the following operating steps:

a) positioning the four lens transport suction-cup seats 51a,b,c,d of said turret 51 respectively at the four operating stations 11, 200, 300, 40 operating the first motor means 52 so that it is possible to pick up a raw lens from the lens exit portion 11, position a raw lens in the first lens housing seat 200, position a semi-finished lens already subjected to cutting in the second lens housing seat 300 and leave a processed lens in the processed lens unloading zone 40;

b) activating said lens cutting system 20 and said lens drilling-milling-engraving system 30 to perform cutting operations and drilling and/or milling and/or engraving operations respectively on the raw lens deposited in the first lens housing seat 200 and on the semi-finished lens deposited on the second lens housing seat 300; and c) rotating the turret 51 by 90° so as to shift for one station each of the four suction-cup lens transport seats 51a, b,c,d from the previously engaged operating station to the adjacent operating station so that it is possible to pick up a new raw lens from the lens exit portion 11, position a raw lens in the first lens housing seat 200, position a semi-finished lens already subjected to cutting in the second lens housing seat 300 and leave a processed lens in the processed lens unloading zone 40.

The term machine 1 "fully operational" refers to the operating situation wherein machine 1 operates with the transport seats all engaged by one lens. In order to become "fully operational" the machine 1 passes through a transient operation state during which the operating cycle has not been completed (beginning with the picking-up of one raw lens; a single transport seat is engaged) with those transport seats that are only partially engaged. The passage from transient operation to fully operational takes place after four incomplete cycles, when all of the transport seats are engaged by lenses.

Figures 20, 21, 22:
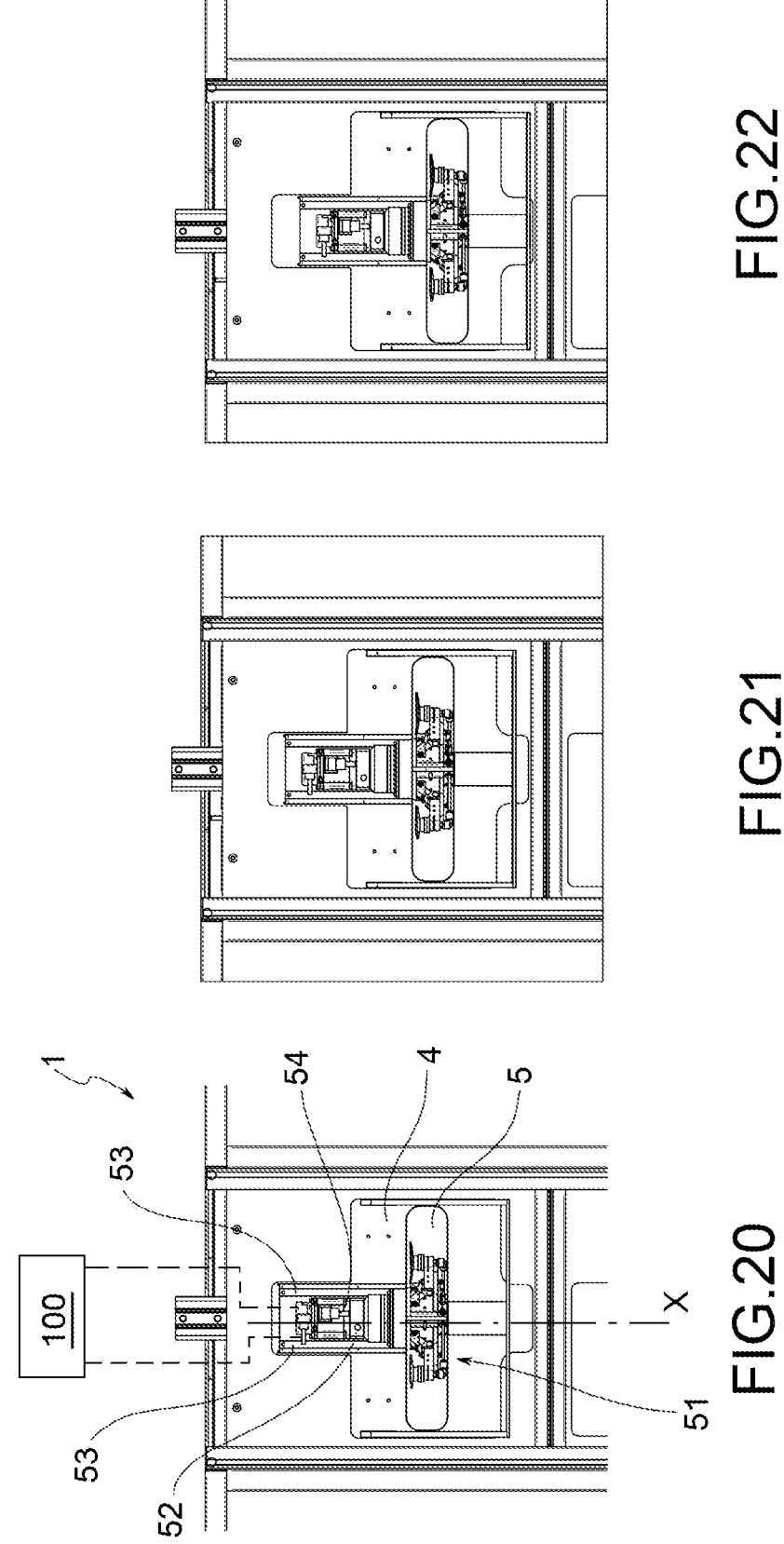
FIGS. 20, 21 and 22 show three orthogonal views from above of the machine shown in FIG. 16 with some parts removed to better highlight others, wherein a lens transfer apparatus is shown in three different operational positions.
Figure 23:
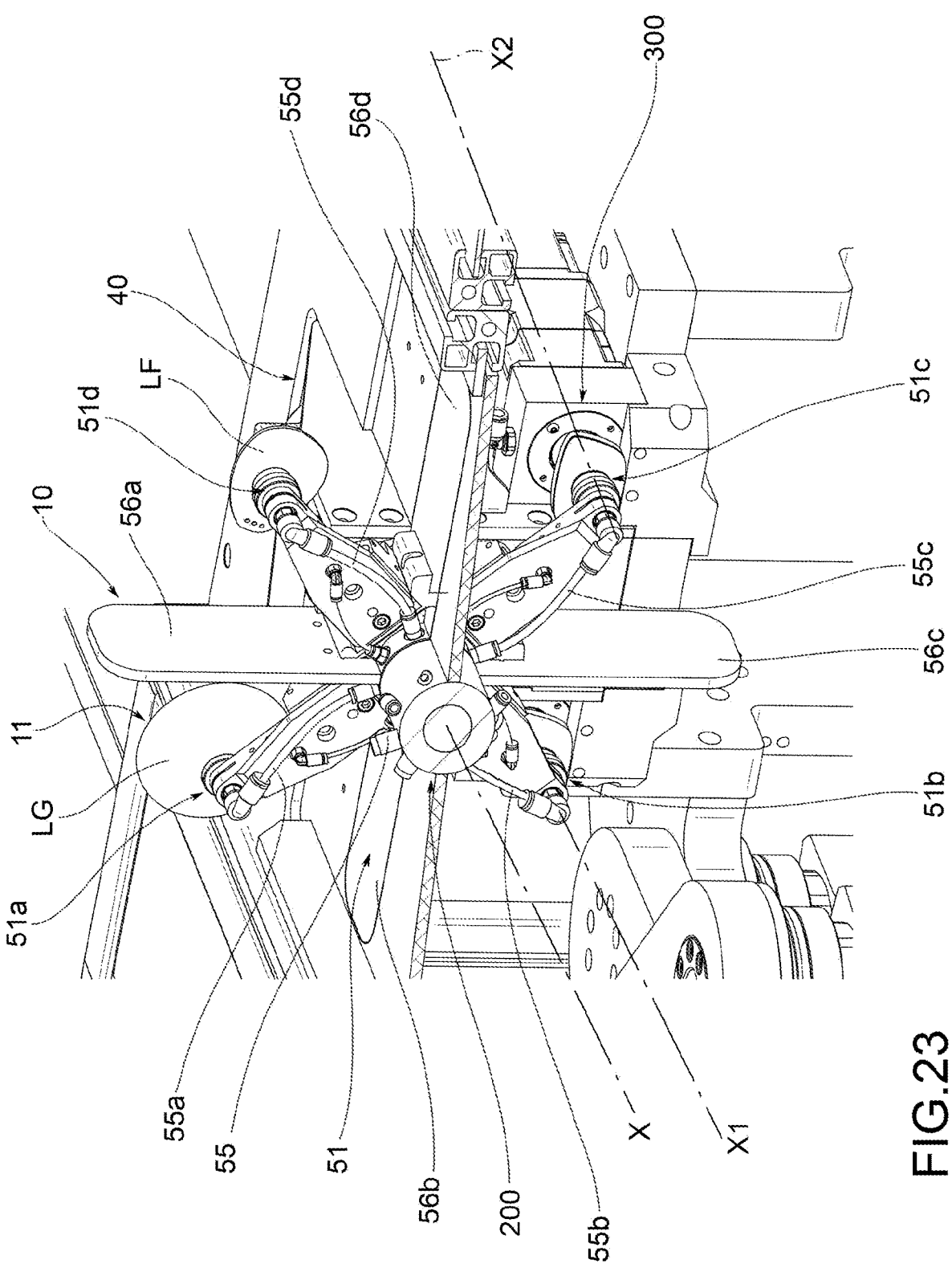
FIGS. 23, 24 and 25 show three perspective views of a detail of the lens transfer apparatus shown in FIG. 20 in relation to a turret, shown in three different operational positions.
Figure 24:
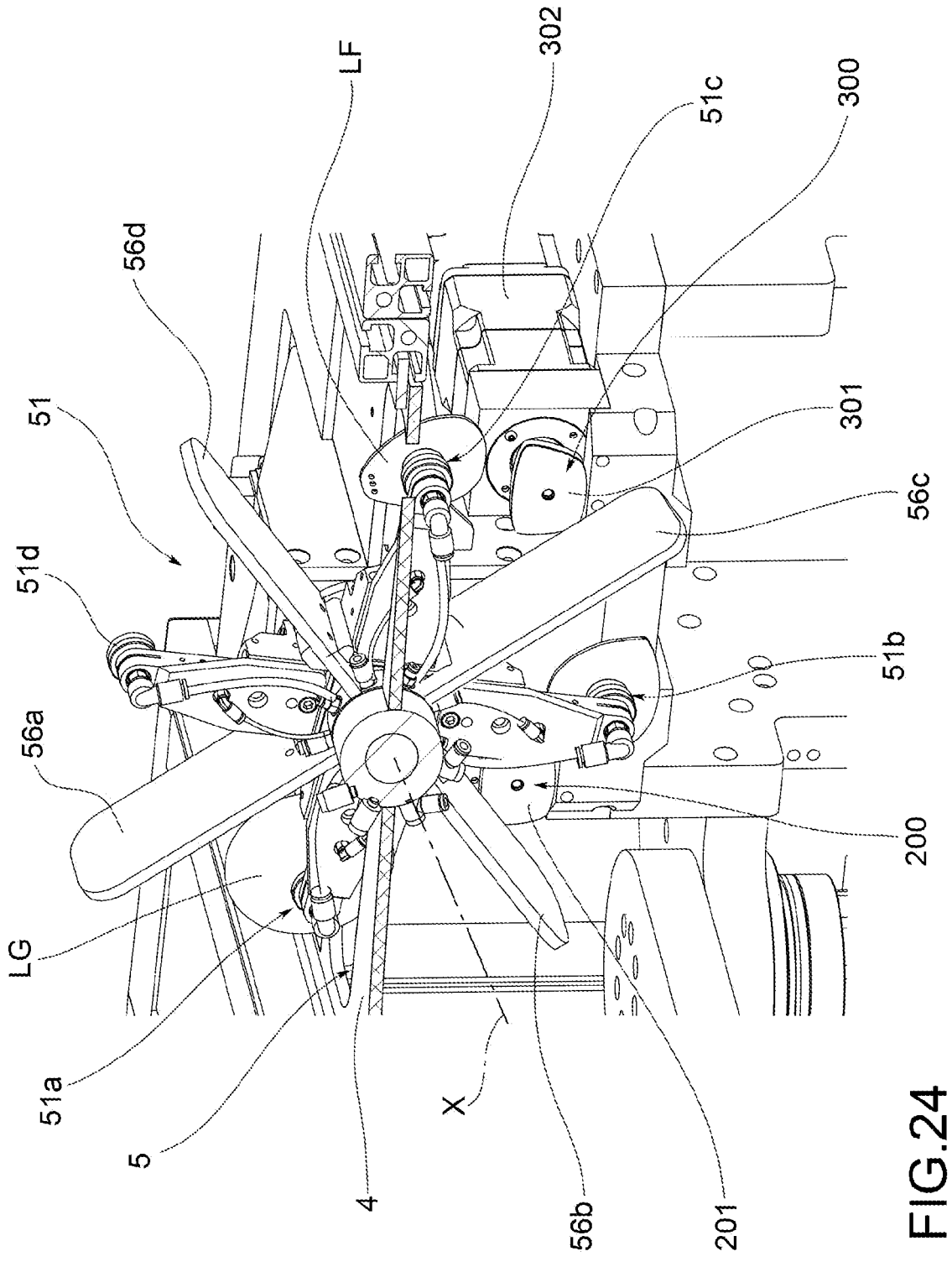

Advantageously, as shown in FIGS. 20, 21 and 22, the lens transfer apparatus 50 is mounted on guides 53 parallel to said turret axis and comprises second motor means 54 (which in particular may consist of a pneumatic cylinder) suitable to translate said lens transfer apparatus 50 parallel to said turret axis X so as to axially move each transport seat 51*a,b,c,d* towards or away from the corresponding operating station. Preferably, said second motor means 54 are controlled by said management and control unit 100, as shown in FIGS. 1 and 20.

In more detail, the turret 51 is moved away from the operating stations before rotating the turret itself by 90° so as to shift the transport seats 51*a,b,c,d* from one operating station to another (see FIG. 22). The turret 51 in instead moved towards the operating stations in such a way that those lenses that are transferred by the transport seats may operationally engage the operating stations (see FIG. 21). In particular, in the second and third operating station (the cutting station and the drilling/milling/engraving station) the axial pressure exerted by the respective transport seats of the turret allow the lenses to be held in a stable manner in the first lens housing seat and in the second lens housing seat.

Preferably, the lens transfer apparatus 50 is provided with a pneumatic suction-cup supply circuit 55 comprising four independent arms 55*a,b,c,d* in order to independently feed each suction-cup of the transport seats. Each arm may be alternatively connected to a vacuum source and a pressure source, in such a way that the lens may be alternately vacuum held on the transport seat or else the lens may be detached from the transport seat generating a jet of pressurized air. Advantageously, the jet of air may also be used to keep the transport seat clean. In this way it is also possible to differentiate the intervention times from suction-cup to suction-cup.

According to a preferred embodiment of the invention, said turret 51 comprises four arms 57*a,b,c,d* which extend in length radially from said turret axis X and each carries one of said lens transport seats 51*a,b,c,d*.

Preferably, each of the four arms (even though they are in angularly fixed positions with respect to the turret axis X) are adjustable in inclination in relation to a plane that is orthogonal to the turret axis X and in length so as to able to adjust the orientation of the respective transport seat with respect to the first and second lens housing seat to be axially aligned and parallel thereto. Such adjustment reduces the risk of damage to the lens.

Preferably, the first lens housing seat 200 and the second lens housing seat 300 are both suitable to rotate the lens received thereby respectively around a first lens rotation axis X1 and a second lens rotation axis X2.

In more detail, the first lens housing seat 200 and the second lens housing seat 300 both comprise:

a lens support 201, 301 in a soft material (for example an elastomeric material) suitable to receive a lens by adapting to it without ruining it;

a motorized shaft 202, 302 which carries an associated lens support 201, 301 to rotate around the respective lens rotation axis and is controlled by said management and control unit 100 (as shown in FIGS. 7 and 12).

Advantageously, the lens transport seats 51*a,b,c,d* of the turret 51 are mounted rotationally free on the respective arm of the turret 51 around a rotation axis parallel to the turret axis X (for example by means of washers), in such a way that they may support the lenses in the first lens housing seat 200 and in the second lens housing seat 300 (in contact with the lens support) without hindering the rotation thereof.

Preferably, the first X1 and the second lens rotation axis X2 are parallel to each other, and in particular horizontally; the rotation axis X is parallel thereto.

According to the embodiment shown in the accompanying figures, and in particular in the figures from 7 to 9 and from 16 to 18, the first articulated arm 211 of the lens cutting system 20 consists of an articulated structure that:

has three rotation axes Z1', Z2, Z3 parallel to each other (wherein each thereof defines one articulation of the articulated structure); and is rotationally connected to said support structure 2 around a first axis Z1' of said first three rotation axes.

The first spindle-holder head 210 is rotationally associated with a free end of said structure articulated around a third axis Z3' of said first three rotation axes and in turn defines a first spindle rotation axis Y1 that lies on a plane orthogonal to said third axis Z3.

Preferably the aforementioned three first rotation axes Z1', Z2', Z3' are vertical and the aforementioned first lens rotation axis X1 is horizontal. With such configuration, the plane on which there lies said first spindle axis Y1 is horizontal.

Advantageously, each of said three first rotation axes Z1', Z2', Z3' is defined by a motorized shaft 221, 222, 223, controlled by said management and control unit 100 (as shown in FIG. 7).

Figure 8:
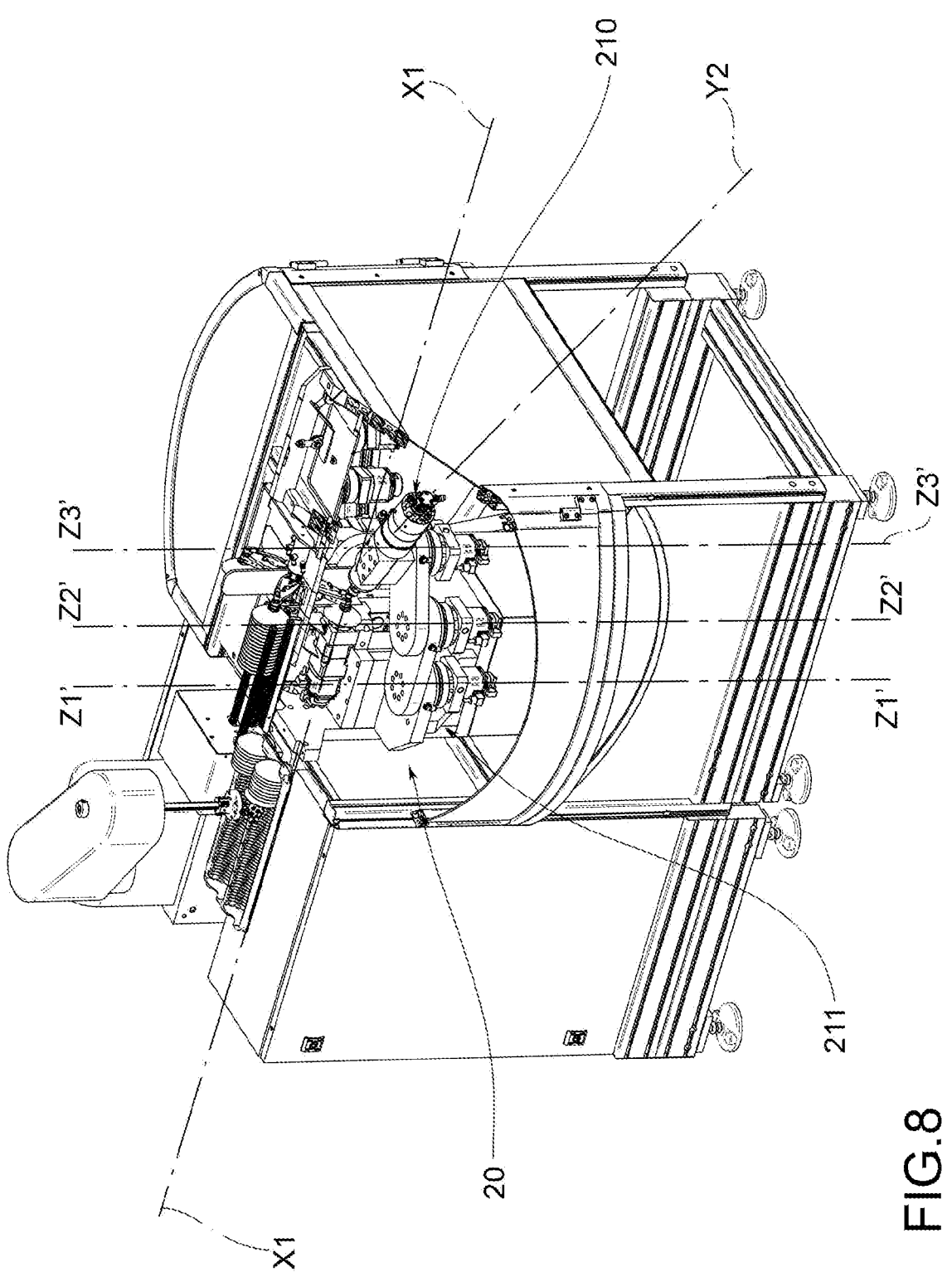
Figure 9:
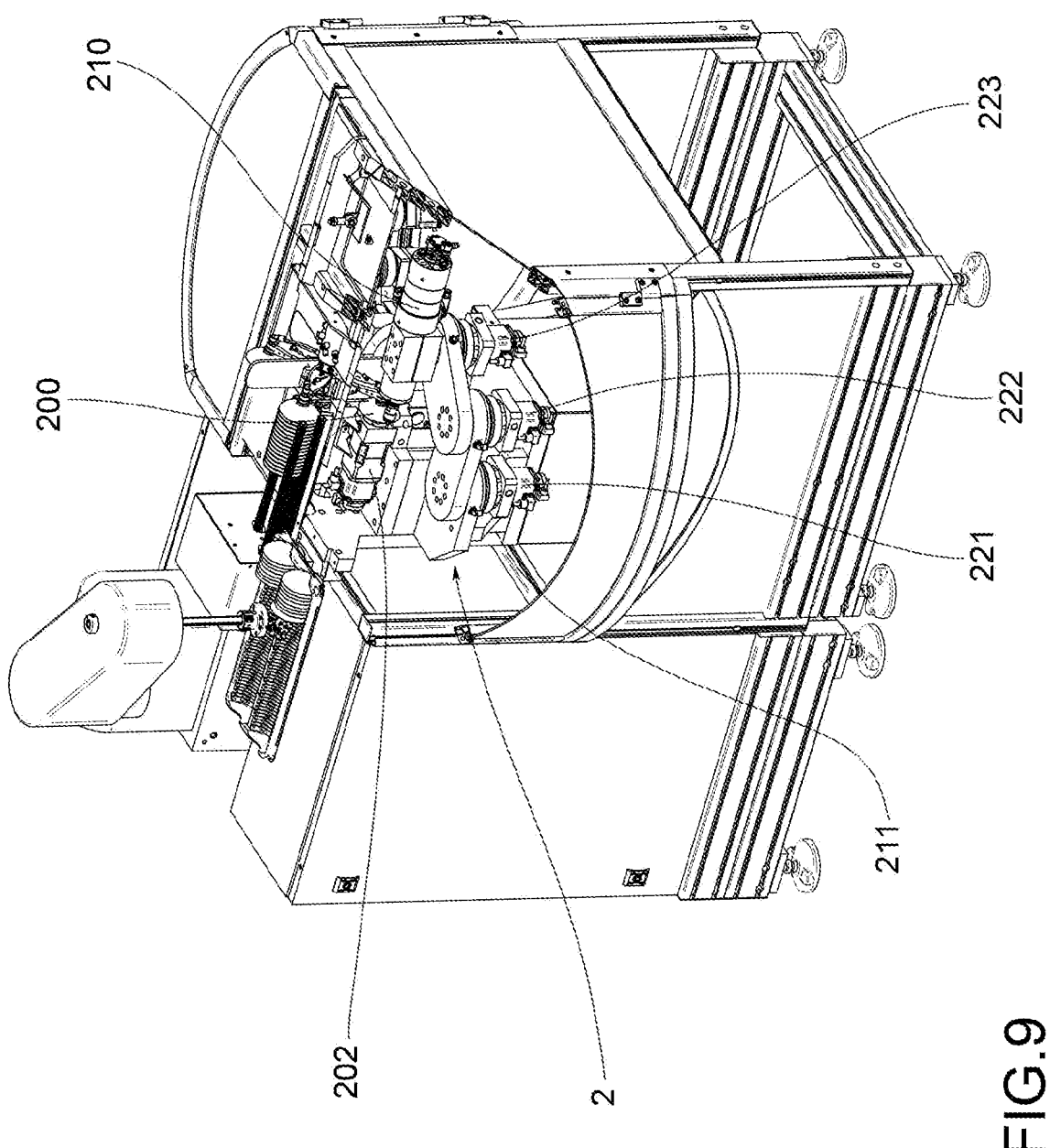
Figure 10:
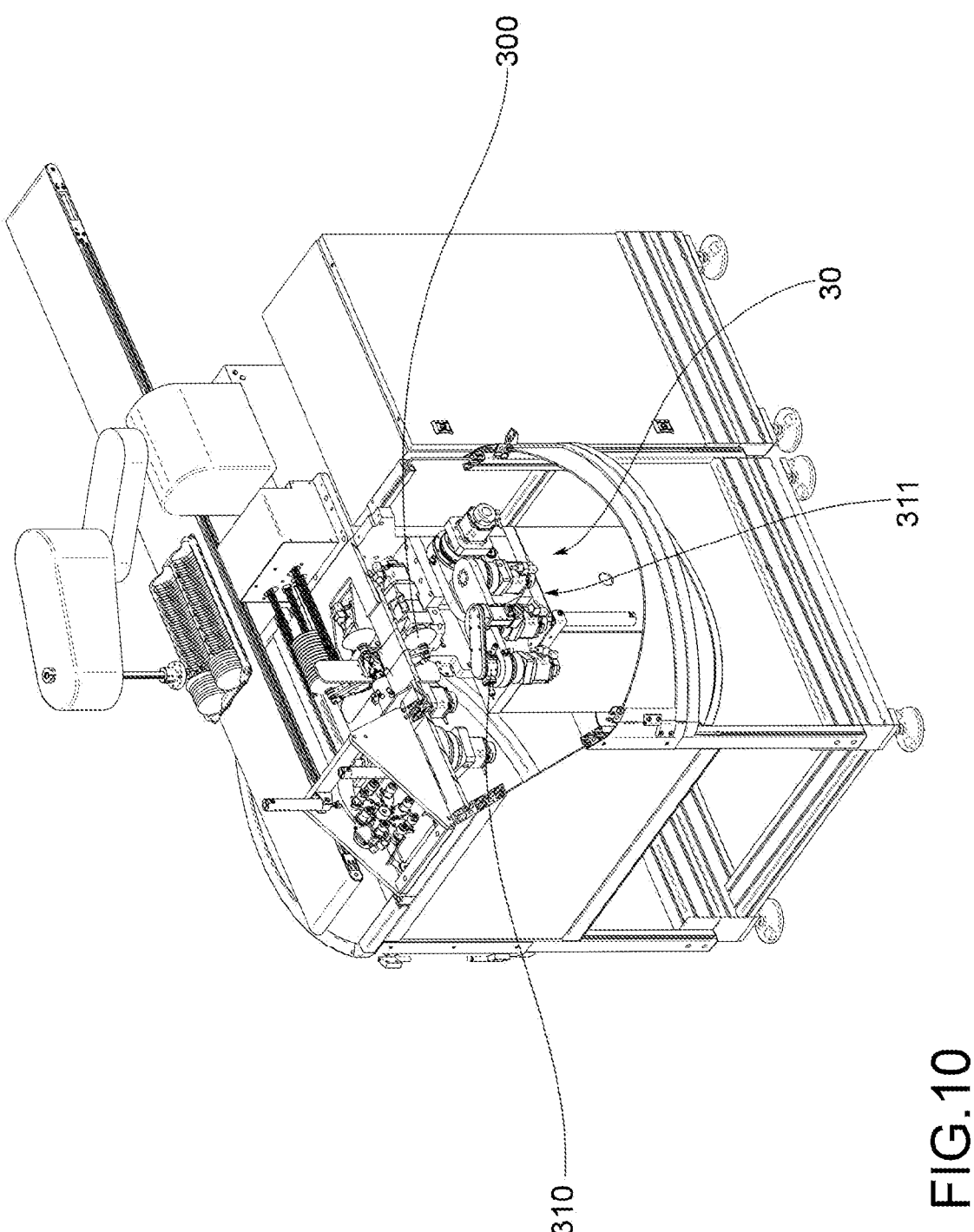
FIGS. 10 to 15 show six perspective views of the machine of FIG. 1 with some parts removed to better highlight others and partially cross-sectioned at the area wherein a lens drilling-milling-engraving system is arranged.
Figure 11:
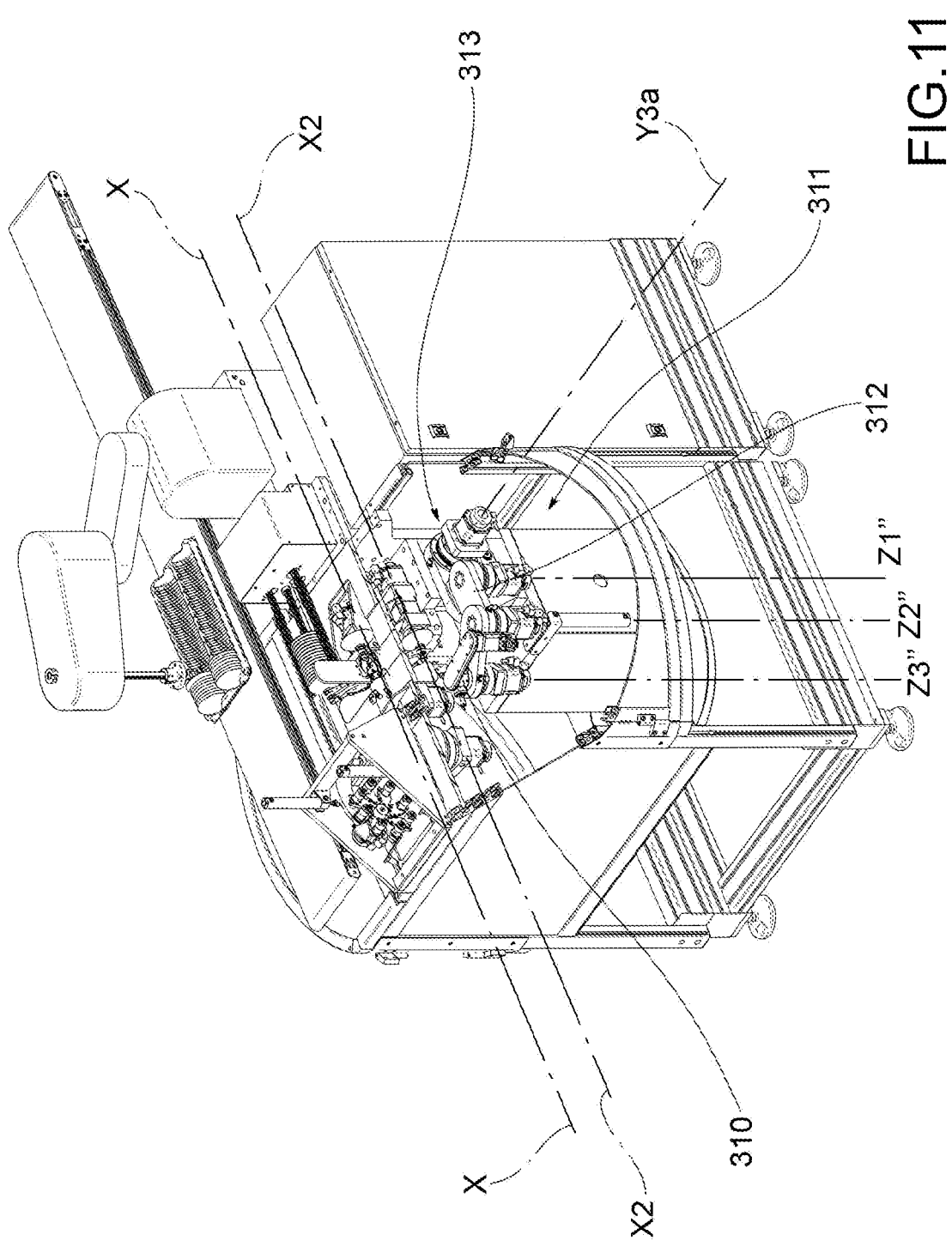

Preferably, the management and control unit 100 is programmed in order to adjust the orientation of the first spindle rotation axis Y1 with respect to the first lens housing seat 200 varying the angular position of the first spindle-holder head 210 around the third axis Z3' of said first three rotation axes, as may be seen in comparing FIGS. 8 and 9.

In more detail, regulating the orientation of the first spindle rotation axis Y1 with respect to the first lens housing seat 200 makes it possible to vary the angle of incidence of the tool upon the surface of the lens. By virtue of this, the machine 1 capable of cutting normal to the surface of the lens in also being able to use unshaped tools as well as creating cutting angles that a shaped tool is unable to make.

Advantageously, from an operational point of view, the management and control unit 100 is programmed to perform the cutting operations by generating a relative motion of contact between the lens and the tool supported by the first spindle-holder head 210, by rotating the lens around the first lens rotation axis X1 by means of the first lens housing seat 200 and adjusting the position of the first spindle rotation axis Y1 with respect to the first lens housing seat 200, as a function of a predefined lens cutting program.

As shown in FIG. 8, the lens cutting system 20 therefore operates on a total of four rotation axes: three axes Z1', Z2', Z3' given by the articulated structure and a forth axis corresponding to the first rotation axis X1. The rotations around each of said four axes are independently controlled by the management and control unit 100 and may be exploited in order to define a relative motion between lens and tool that, through interpolation, reproduces a predefined lens cutting line.

Preferably, as shown in particular in FIGS. 7, 8 and 9, the first spindle-holder head 210 is single-spindle and is suitable to support one cutting tool at a time.

Advantageously, the machine 1 comprises a cutting tool storage 80 which is supported by said support structure 2 in a position reachable by said first spindle-holder head 210 by means of said first articulated arm 211.

According to the preferred embodiment shown in the accompanying figures, and in particular in the figures from 10 to 18, the second articulated arm 311 of the lens drilling-milling-engraving system 30 comprises an articulated structure 312 that has three second rotation axes Z1", Z2", Z3" that are parallel to each other.

In more detail the second spindle-holder head 310 is rotationally associated with a free end of said articulated structure 312 around a third axis Z3" of said second rotation axes and defines at least one second spindle rotation axis Y2$a,b,c$ which lies on a plane orthogonal to said third axis Z3".

Said articulated structure 312 is connected to the support structure 2 of the machine 1 by means of a mechanism 313 suitable to translate said articulated structure 312 orthogonally to the plane in which said at least a second spindle axis Y2$a,b,c$ lies. The mechanism 313 is motorized.

Preferably, as shown in figures from 13 to 16, said mechanism 313 consists of an articulated parallelogram connection system (or a pantograph). The four sides of the articulated parallelogram are indicated with 313$a,b,c,d$ in the figures, whilst the four axes of articulation (parallel to each other) are indicated with Y3$a,b,c,d$.

In more detail, the articulated parallelogram connection system 313 is configured to translate said articulated structure 312 orthogonally to the plane in which said at least one second spindle axis Y2 lies by means of rotations around a first articulated parallelogram axis Y3$a$ whereto the articulated parallelogram connection system 313 is connected to the support structure 2 of the machine 1. In particular, the opposite sides of the articulated parallelogram are equal one to the other.

Advantageously, each of said three second rotation axes Z1", Z2", Z3" and said first articulated parallelogram axis Y3$a$ is defined by a motorized shaft 321, 322, 323, 324, controlled by said management and control unit 100 (as shown in FIG. 12).

Preferably the aforementioned three second rotation axes Z1", Z2", Z3" are vertical and said second lens rotation axis X2 is horizontal. With such configuration, the plane where-upon said at least a second spindle axis Y2$a,b,c$ lies is horizontal, and the first articulated parallelogram axis Y3$a$ is horizontal.

Preferably, from an operational point of view, the articulated parallelogram connection system 313 may be locked in position by means of the braking action exerted by the motor means of the motorized shaft.

Advantageously, the articulated parallelogram connection system 313 may comprise an auxiliary weight balancing system 314 that is suitable to replace/supplant the motor braking action in the case of a stoppage of machine 1.

Preferably, such weight balancing system 314 is constituted by a pneumatic or hydraulic cylinder 315 that connects, by means of two hinges 316$a$ and 316$b$, the articulated parallelogram connection system 313 to said support structure 2 of the machine 1 in an opposite position with respect to the first articulated parallelogram axis Y3$a$.

According to the embodiment shown in the accompanying figures, the second spindle-holder head 310 is multi-spindle and comprises:

a spindle-holder head body 340 that is rotationally associated with said articulated structure 312 by means of the motorized shaft that defines said third rotation axis Z3";

a plurality of spindles 341, 342, 343, preferably three, which are supported by said spindle-holder head body 340 and that are distributed around said third rotation axis Z3" to be positioned one at a time at the second housing seat 300 as a function of the tool they carry.

Each of said spindles 341, 342, 343 defines a second spindle rotation axis Y2$a,b,c$ thereof that lies on a plane orthogonally to said third axis Z3".

The spindles are each provided with independent motorized means (preferably electric).

Figure 19:
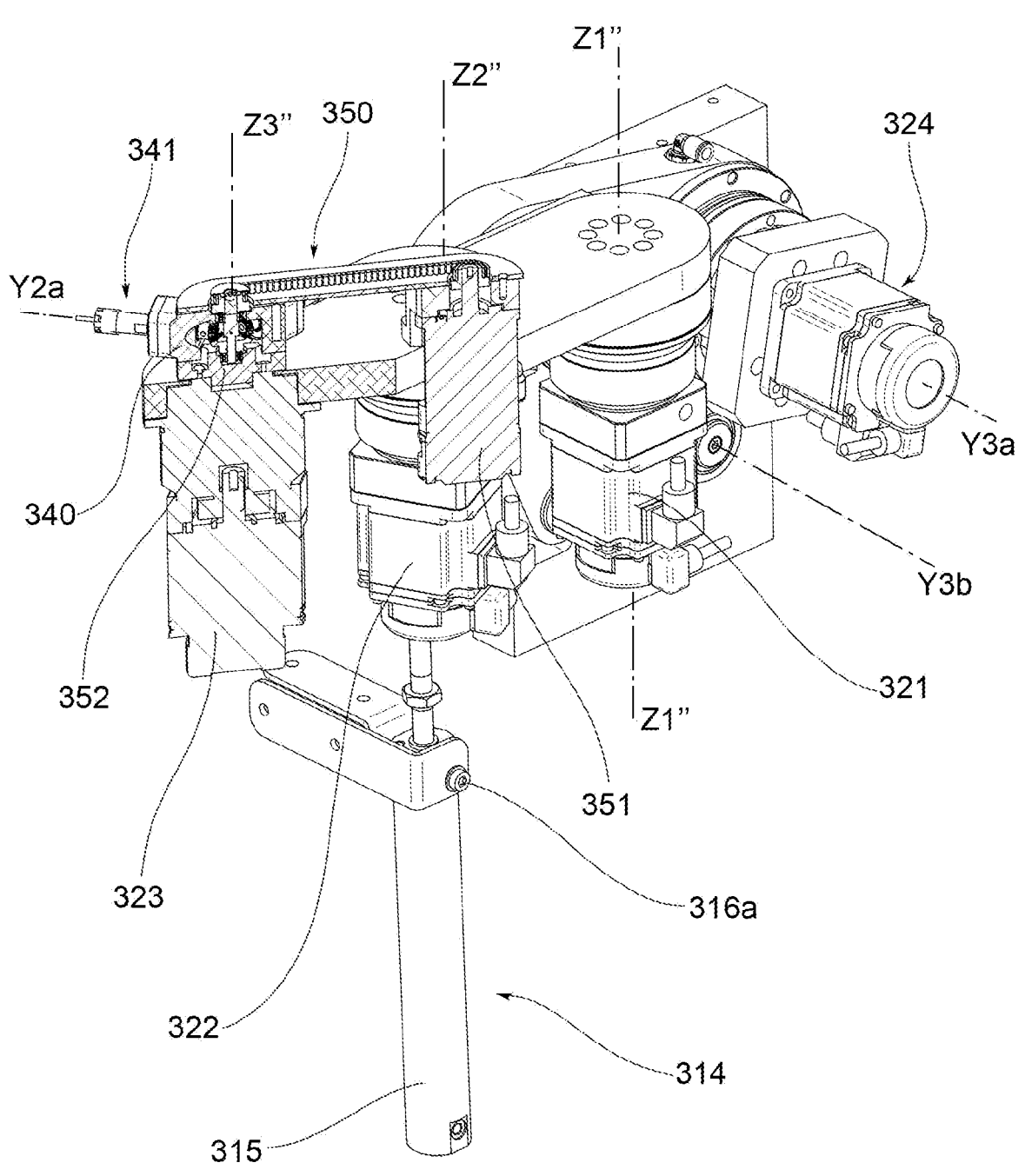
FIG. 19 shows a perspective view of the lens drilling-milling-engraving system present within the machine of FIG. 1 with some parts partially cross-sectioned.

Preferably, as shown in particular in FIG. 19, for space reduction reasons, the spindles have in common the same motors 351. In more detail, the motor means 351 are connected to the single spindles by means of a transmission system 350 and by a distribution system 352, that in particular may comprise a conical wheel for each spindle.

In the preferred case wherein the second spindle-holder head 310 is multi-spindle (in particular tri-spindle) it may work directly with multiple tool versions thereby eliminating tool change-over downtimes. This leads to a further increase in productivity.

Advantageously, the management and control unit 100 is programmed to:

position, at the second housing seat 300, the spindle 310$b,c,d$ which carries the previously selected tool for a defined lens drilling-milling-engraving operation to be performed; and/or adjust the orientation of the second spindle rotation axis Y2$a,b,c$ of the selected spindle with respect to the second lens housing seat (300), by varying the angular position of the head of the spindle-holder head 310$a$ around the third axis Z3" of said second rotation axes.

Advantageously, from an operational point of view, the management and control unit 100 is programmed to perform the lens drilling-milling-engraving operations, by generating a relative motion of contact between the lens and one of the tools supported by the second spindle-holder head 310 by means of rotations, also only partial rotations, of the lens around the second lens rotation axis X2 by means of the second lens housing seat 300 and adjusting the position of the tool as well as the orientation of the second spindle rotation axis Y2$a,b,c$ with respect to the second lens housing seat 300, as a function of a predefined lens drilling-milling-engraving program.

The lens drilling-milling-engraving system 30 thus operates on a total of five rotation axes: three axes given by the articulated structure, a forth axis corresponding to the first articulated parallelogram axis Y3$a$ and a fifth axis corresponding to the second lens rotation axis X2. The rotations around each of said five axes are independently controlled by the management and control unit 100 and may be exploited in order to define a relative motion between lens and tool that, through interpolation, reproduces a predefined lens drilling-milling-engraving path.

Advantageously, the use of articulated arms with parallel axes makes it possible to reduce the amplitude of the excursions in the movements of the spindle-holder heads.

This results in less demand for space and thus greater compactness of the machine itself. By virtue of the compactness of the dimensions the machine 1 may be arranged within smaller spaces and is therefore easier to install.

Figure 30:
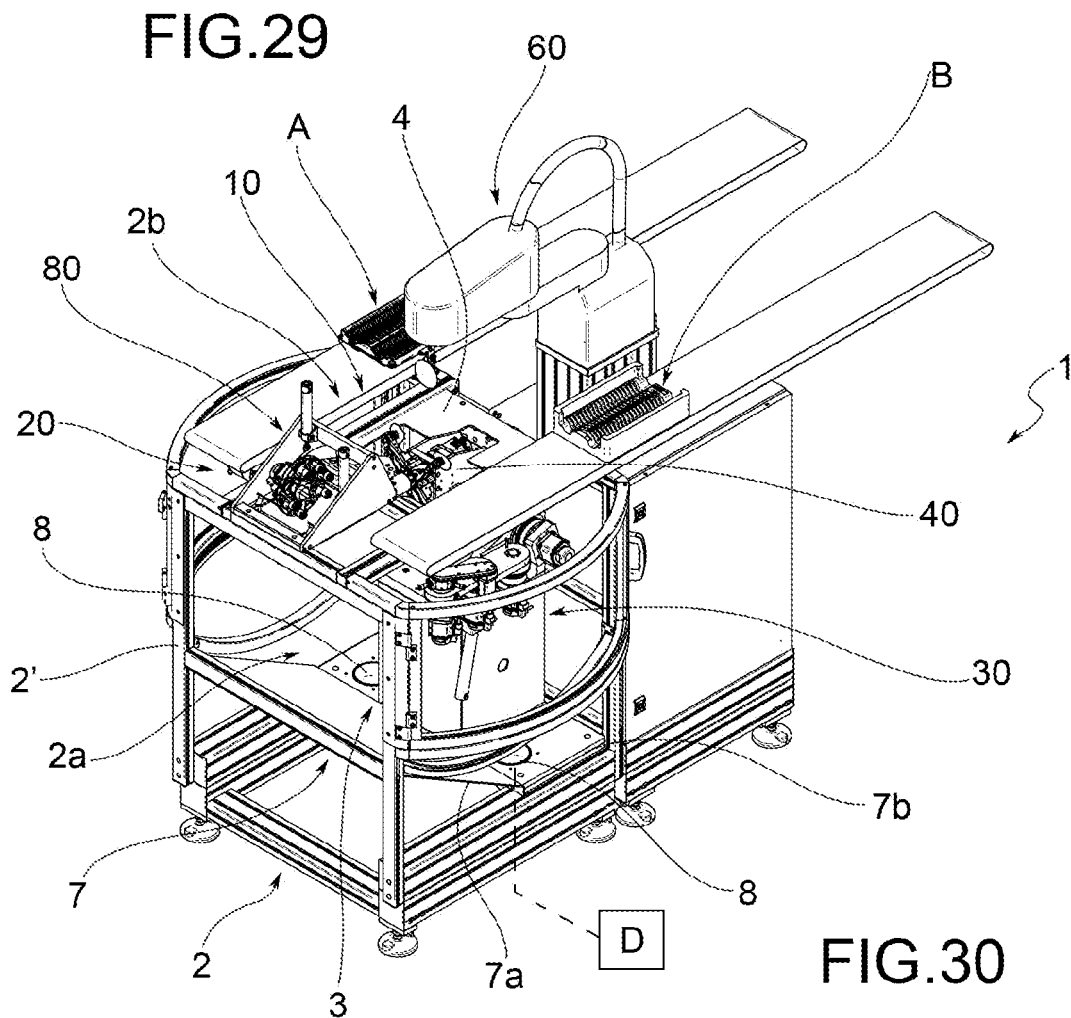
FIG. 30 shows a front perspective view of the machine shown in FIG. 1, wherein some containment panels have been removed.

Advantageously, as shown in FIG. 30, the support structure 2 of the machine 1 delimits:

a first operating area 2a in which the lens cutting system 20 and the lens drilling-milling-engraving system 30 are arranged;

a second operating area 2b in which the apparatus 10 for loading and storing raw lens and the processed lens unloading zone 40 are arranged.

Said first operating area 2a is confined to a closed chamber 3. In this way the shavings produced by the cutting, drilling, milling, engraving operations are confined to the closed chamber and not dispersed throughout the machine. This facilitates the cleaning and maintenance operations.

Preferably said second operating area 2b is obtained above said closed chamber 3.

Advantageously, said second operating area 2b and said closed chamber 3 are separated by a partition wall 4 which preferably acts as a support plane for the apparatus 10 for loading and storing raw lenses and the processed lens unloading zone 40.

Advantageously, as shown in particular in FIG. 30, the lenses transfer apparatus 50 is arranged between said second operating area 2b and said closed chamber 3.

A slit 5 is open in said partition wall 4 for the free passage of the turret 51.

In more detail, the slit 5 extends in length transversely to said turret axis X which passes on the middle line of said slit.

Advantageously, the turret 51 is provided with four paddles 56a,b,c,d, which:

extend radially from the turret axis X each between one lens transport seat and the other and are configured such that, when the transport seats 51a,b, c,d are each at one of the operating stations, two of said paddles jointly occupy said slit, closing it.

Advantageously, the presence of the paddles keeps the two operating areas 2a and 2b separate thereby preventing shavings from moving from the first operational area to the second.

Preferably, as shown in FIG. 30, the closed chamber 3 is delimited therebelow by a back wall 7, that has at least one inclined portion 7a serving as a chute for shavings from the lens processing to a portion of the back wall whereinto one or more through holes 8 are cut whereto suction systems D may be connected for automatic shavings removal.

Advantageously, as shown in the Figures from 26 to 28, the cutting tool storage 80 is arranged in said second operating area 2b near a hatch 6 which is obtained on said partition wall 5. Operationally, said storage 80 is temporarily positionable in said first operating area 2a, passing through said hatch 6 by means of a movement mechanism 81 to allow said first spindle-holder head 310 to reach said storage 80 remaining inside said first operating area 2a. This results not only in reduced cutting tool change-over times, but also in space containment and thus in greater compactness of the machine.

Preferably, the movement mechanism 81 is provided with an actuator that is controlled by said management and control unit 100, as shown in FIG. 1.

Figures 3, 4:
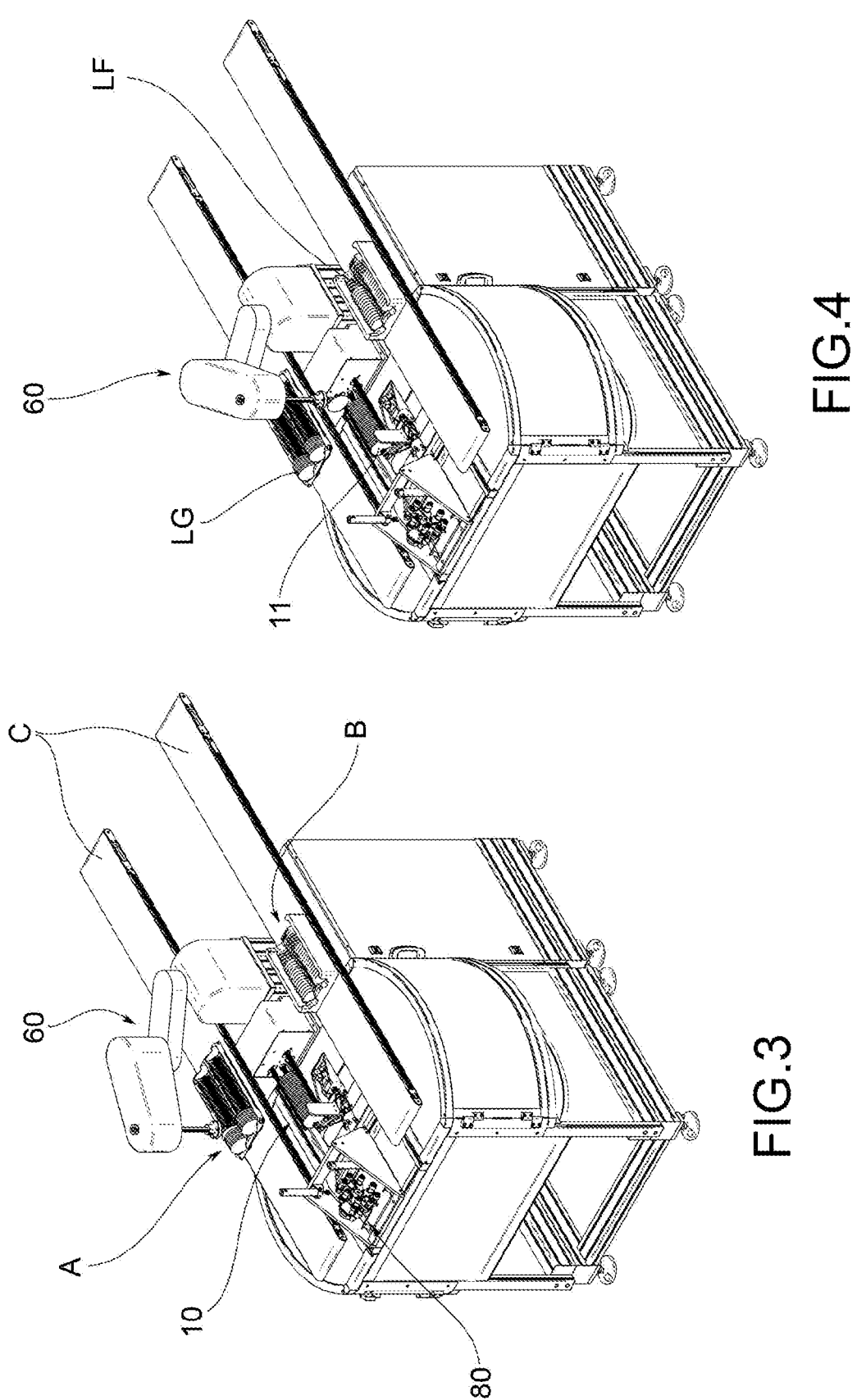
FIGS. 3 and 4 show two perspective views of the machine of FIG. 1 in the configuration assumed during a step of loading raw lenses into a lenses storage and loading apparatus.

Advantageously, said machine 1 comprises at least one robotic arm 60 that is suitable to:

load raw lenses into said apparatus 10 for loading and storing by picking up them from a raw lenses storage A outside the machine 1 (see FIGS. 3 and 4); and pick up processed lenses from said processed lens unloading zone 40 to move them to a processed lens collection storage B outside the machine 1 (see FIGS. 5 and 6).

Figure 2:
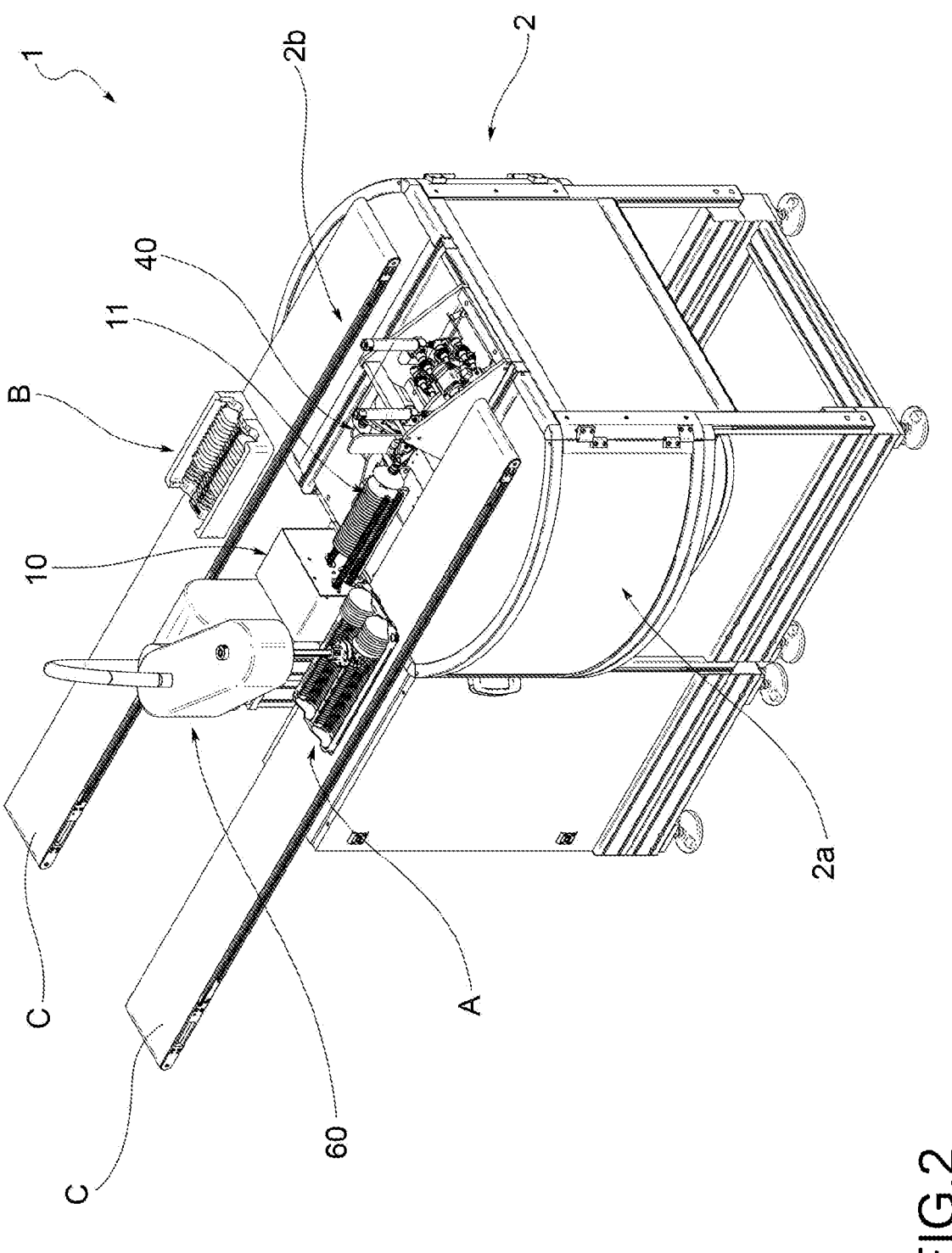

Advantageously, as shown in particular in FIG. 2, the machine 1 may be provided with two conveyor belts C whereupon one or more raw lens storages A and one or more processed lens collection storages B may be arranged for the automated handling thereof.

Figure 29:
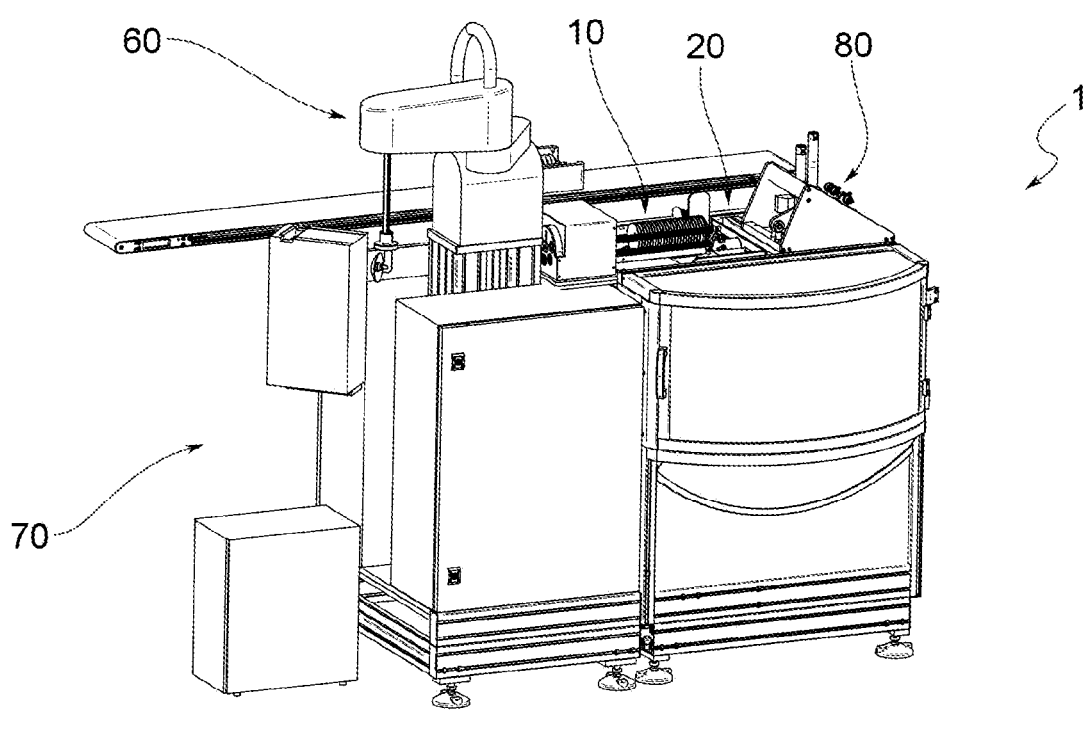
FIG. 29 shows a rear perspective view of the machine of FIG. 1 during a step for positioning a lens within a system for creating characters and/or drawings.

Advantageously, as shown in FIG. 29, the machine 1 may comprise a system 70 for creating characters and/or drawings on the lenses by means of lasers or printing systems.

In particular, said system 70 for creating characters and/or drawings is within a zone of said machine 1 not reachable by said turret 41. Operationally, said robotic arm 60 is also suitable to:

pick up lenses from said processed lenses unloading zone 40 to move them in said system 70 for creating characters and/or drawings; and pick up processed lenses from said system 70 for creating characters and/or drawings to move them to a processed lenses collection storage outside the machine 1.

The invention allows numerous advantages to be obtained which have been explained throughout the description.

The machine 1 for processing lenses, according to the invention integrates the cutting operations and, when running, the operations for the drilling, engraving and milling of the lenses, thereby increasing the operational flexibility of current machines, significantly reducing the downtime of transferring a lens from one station to another.

The machine 1 for processing lenses according to the invention makes it possible to perform the operations of loading and unloading lenses independently of the processing operations that are performed on the lenses.

The machine 1 for processing lenses according to the invention is capable of cutting in a direction that is normal to the surface of the lens (also being able to use non-shaped tools) and at the same time capable of creating cutting angles that a shaped tool cannot achieve.

The machine 1 for processing lenses according to the invention makes it possible to perform the operations for the drilling, engraving and milling of lenses using angles other than the direction that is normal to the surface of the lens, thereby increasing the operational flexibility thereof, without, however affecting productivity.

The machine 1 for processing lenses according to the invention may also integrate operations for creating characters and drawings on the lenses, increasing the operational flexibility thereof, without, however affecting productivity.

The machine 1 for processing lenses according to the invention is mechanically reliable.

The machine 1 for processing lenses according to the invention is, at the same time, constructively simple to create.

The machine 1 for processing lenses according to the invention is easy to clean and maintain.

The invention thus conceived therefore achieves its intended objectives.

Obviously, in practice it may also assume different forms and configurations from the one illustrated above, without thereby departing from the present scope of protection.

Furthermore, all details may be replaced with technically equivalent elements, and the dimensions, shapes, and materials used may be any according to the needs.

The invention claimed is:

1. A machine for processing lenses, the machine comprising:

a support structure;

an apparatus for loading and storing raw lenses which comprises a lens exit portion and which is installed on said support structure;

a lens cutting system which is installed on said support structure and which comprises: a first lens housing seat to receive one lens at a time; a first spindle-holder head for holding a cutting tool, the first spindle-holder head being positionable at said first lens housing seat by a first articulated arm connected to said support structure to perform cutting operations on said lens;

a lens drilling-milling-engraving system installed on said support structure and comprising: a second lens housing seat to receive one lens at a time; and a second spindle-holder head for holding at least one tool for drilling, milling, or engraving, the second spindle-holder head being positionable at said second lens housing seat by a second articulated arm connected to said support structure to perform drilling, milling, or engraving operations on said lens;

a processed lens unloading zone which is installed on said support structure;

a lens transfer apparatus which is configured to pick up one lens at a time from said loading and storage apparatus to bring the picked up lens sequentially into the first lens housing seat of said lens cutting system, into the second lens housing seat of said lens drilling-milling-engraving system, and into the processed lens unloading zone; and a management and control unit;

wherein the lens exit portion, the first lens housing seat, the second lens housing seat, and said processed lens unloading zone constitute four operating stations of said machine;

wherein said lens transfer apparatus comprises a turret having four suction-cup seats for transporting lenses, each of said four suction-cup seats being configured to receive a single lens at a given time, and wherein said lens transfer apparatus further comprises a first motor to rotate said turret about a turret axis so as to cyclically bring each suction-cup seat in sequence to said four operating stations of the machine, the four operating stations being arranged on a circumference centered on said turret axis in angular positions spaced 90° apart from each other.

2. The machine according to claim 1, wherein the management and control unit is programmed to control said lens transfer apparatus, said lens cutting system, and said lens drilling-milling-engraving system so that when fully operational the machine cyclically repeats the following operating steps:

a) positioning the four suction-cup seats of said turret respectively at the four operating stations, operating the first motor to enable picking up a raw lens from the lens exit portion, positioning the raw lens in the first lens housing seat, positioning a semi-finished lens already subjected to cutting in the second lens housing seat, and leaving a processed lens in the processed lens unloading zone;

b) activating said lens cutting system and said lens drilling-milling-engraving system to perform the cutting operations and the drilling, milling, or engraving operations respectively on the raw lens deposited in the first lens housing seat and on the semi-finished lens deposited on the second lens housing seat; and c) rotating the turret by 90° to shift each of the four suction-cup seats from a previously engaged operating station to an adjacent operating station to enable picking up a new raw lens from the lens exit portion, positioning the new raw lens in the first lens housing seat, positioning a semi-finished lens already subjected to cutting in the second lens housing seat, and leaving a processed lens in the processed lens unloading zone.

3. The machine according to claim 1, wherein said lens transfer apparatus is mounted on guides that extend parallel to said turret axis, and wherein said lens transfer apparatus further comprises a second motor to translate said lens transfer apparatus parallel to said turret axis to axially move each suction-cup seat towards or away from the corresponding operating station.

4. The machine according to claim 1, wherein said lens transfer apparatus comprises a pneumatic suction cup supply circuit, which is alternatively connectable to a vacuum source and a pressure source.

5. The machine according to claim 1, wherein said turret comprises four arms, each extending in length radially from said turret axis and each of the four arms carrying a respective one of said four suction-cup seats.

6. The machine according to claim 1, wherein the first lens housing seat is configured to rotate the lens received therein about a first lens rotation axis, wherein the second lens housing seat is configured to rotate the lens received therein about a second lens rotation axis, and wherein each of said four suction-cup seats is mounted rotationally free on a respective arm of the turret so that the four suction-cup seats can support the lenses in the first lens housing seat and in the second lens housing seat without hindering rotation of the first and second housing seats.

7. The machine according to claim 6, wherein the first articulated arm of the lens cutting system comprises an articulated structure having three first rotation axes that extend parallel to each other and where the articulated structure is rotationally connected to said support structure about a first axis of said first three rotation axes, and wherein the first spindle-holder head is disposed on distal end of said articulated structure and is pivotable about a third axis of said first three rotation axes, and where the first spindle-holder head defines a first spindle rotation axis lying on a plane orthogonal to said third axis, said first three rotation axes being vertical axes and said first spindle rotation axis being a horizontal axis.

8. The machine according to claim 7, wherein each of said three first rotation axes is defined by a motorized shaft, controlled by said management and control unit.

9. The machine according to claim 7, wherein said first spindle-holder head is a single-spindle configured to support a single cutting tool at a time, and wherein said machine further comprises a cutting tool storage magazine supported by said support structure in a position reachable by said first spindle-holder head through movement of said first articulated arm such that a tool change can be performed.

10. The machine according to claim 9, wherein said support structure delimits:

a first operating area in which the lens cutting system and the lens drilling-milling-engraving system are arranged;

a second operating area in which the apparatus for loading and storing raw lenses and the processed lens unloading zone are arranged;

wherein said first operating area is confined in a closed chamber, with said second operating area being above said closed chamber;

wherein said second operating area and said closed chamber are separated by a partition wall which acts as a support plane for the apparatus for loading and storing raw lenses and the processed lens unloading zone;

wherein said cutting tool storage magazine is arranged in said second operating area proximate a hatch which is on said partition wall, and wherein said cutting tool storage magazine is temporarily positionable in said first operating area passing through said hatch by a mechanism so as to allow said first spindle-holder head to reach said cutting tool storage magazine remaining inside said first operating area such that the tool change can be performed.

11. The machine according to claim 7, wherein the management and control unit is programmed to adjust orientation of the first spindle rotation axis with respect to the first lens housing seat, varying angular position of the first spindle-holder head around the third axis of said first three rotation axes.

12. The machine according to claim 11, wherein the management and control unit is programmed to perform the lens cutting operations by:

generating a relative contact motion between the lens and the cutting tool supported by the first spindle-holder head; rotating the lens about the first spindle rotation axis by the first housing seat; and adjusting the position of the cutting tool as well as the orientation of the first spindle rotation axis with respect to the first lens housing seat as a function of a predefined lens cutting program.

13. The machine according to claim 6, wherein the second articulated arm of the lens drilling-milling-engraving system comprises an articulated structure which has three second rotation axes that extend parallel to each other and which is connected to the support structure by a mechanism to translate said articulated structure orthogonally to a plane in which at least a second spindle axis lies; and wherein the second spindle-holder head is disposed on a distal end of said articulated structure and is pivotable about a third axis of said three second rotation axes, and where the second spindle-holder head defines at least a second spindle rotation axis lying on a plane orthogonal to said third axis of said three second rotation axes.

14. The machine according to claim 13, wherein said mechanism comprises an articulated parallelogram connection system which is configured to translate said articulated structure of the second articulated arm orthogonally to the plane in which said at least a second spindle axis lies by rotation around a first articulated parallelogram axis, and wherein said three second rotation axes being vertical axes and said second spindle rotation axis being a horizontal axis.

15. The machine according to claim 14, wherein each of said three second rotation axes is defined by a motorized shaft, controlled by said management and control unit, and

wherein said first articulated parallelogram axis is defined by a motorized shaft, controlled by said management and control unit.

16. The machine according to claim 13, wherein said second spindle-holder head is multi-spindle and comprises:

a spindle-holder head body rotationally associated with said articulated structure of the second articulated arm by a motorized shaft which defines said third axis of said three second rotation axes;

a plurality of spindles, which are supported by said spindle-holder head body and are distributed around said third axis to be positioned one at a time at the second lens housing seat as a function of the respective tool each of the plurality of spindles carries;

wherein each of said plurality of spindles defines a respective second spindle rotation axis lying on a plane orthogonal to said third axis of said three second rotation axes.

17. The machine according to claim 16, wherein the management and control unit is programmed for:

positioning at the second lens housing seat a selected spindle of the plurality of spindles which carries the previously selected tool for the drilling, milling, or engraving operation to be performed; and/or adjusting orientation of the second spindle rotation axis of the selected spindle with respect to the second lens housing seat; and varying angular position of the spindle-holder head body around the third axis of said second three rotation axes.

18. The machine according to claim 17, wherein the management and control unit is programmed to perform the drilling, milling, or engraving operations by:

generating a relative contact motion between the lens and the tool supported by the selected spindle of the second spindle-holder head, by even only partial rotations of the lens about the second lens rotation axis by the second housing seat; and adjusting the position of the tool of the selected spindle as well as the orientation of the second spindle rotation axis with respect to the second lens housing seat as a function of a predefined lens drilling or milling or engraving program.

19. The machine according to claim 1, wherein said support structure delimits:

a first operating area in which the lens cutting system and the lens drilling-milling-engraving system are arranged;

a second operating area in which the apparatus for loading and storing raw lenses and the processed lens unloading zone are arranged; and wherein said first operating area is confined in a closed chamber, with said second operating area being above said closed chamber.

20. The machine according to claim 19, wherein said second operating area and said closed chamber are separated by a partition wall which acts as a support plane for the apparatus for loading and storing raw lenses and the processed lens unloading zone.

21. The machine according to claim 20, wherein said lens transfer apparatus is arranged between said second operating area and said closed chamber, a slit being formed in said partition wall for free passage of the turret.

22. The machine according to claim 21, wherein said slit extends in length transversely to said turret axis which passes on a middle line of said slit, wherein said turret comprises four paddles, each of which extends radially from the turret axis between a first suction-cup seat and an adjacent suction-cup seat, and wherein the four paddles are configured such that, when the four suction-cup seats are each at one of the operating stations, two of said four paddles jointly occupy said slit, thereby closing the slit.

23. The machine according to claim 1, wherein said machine further comprises at least one robotic arm that is configured to:

load the raw lenses into said apparatus for loading and storing raw lenses by picking up the raw lenses from a raw lens storage disposed outside the machine; and picking up processed lenses from said processed lens unloading zone so as to move the processed lenses to a processed lens collection storage disposed outside the machine.

24. The machine according to claim 1, wherein said machine further comprises a system for creating characters and/or drawings on the lenses by lasers or printing systems.

25. The machine according to claim 24, wherein said system for creating characters and/or drawings is located in a zone of said machine unreachable by said turret and wherein said at least one robotic arm is configured to:

pick up lenses from said processed lens unloading zone to move the lenses into said system for creating characters and/or drawings; and pick up processed lenses from said system for creating characters and/or drawings to move the processed lenses to a processed lens collection storage disposed outside the machine.

26. The machine according to claim 1, wherein said apparatus for loading and storing raw lenses moves said raw lenses towards said lens exit portion.

\* \* \* \* \*